United States Patent
Huang et al.

(10) Patent No.: US 11,978,413 B1
(45) Date of Patent: May 7, 2024

(54) LOOK-UP TABLE ACTIVATION FOR AN ELECTROPHORETIC PANEL

(71) Applicant: Amazon Technologies, Inc., Seattle, WA (US)

(72) Inventors: Tingwei Huang, San Jose, CA (US); Jie Yu, Sunnyvale, CA (US); Prashanth Kalluraya, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/898,110

(22) Filed: Aug. 29, 2022

(51) Int. Cl.
*G09G 3/34* (2006.01)
*G06F 3/0354* (2013.01)

(52) U.S. Cl.
CPC ......... *G09G 3/344* (2013.01); *G06F 3/03545* (2013.01); *G09G 2310/06* (2013.01); *G09G 2310/08* (2013.01); *G09G 2320/0252* (2013.01); *G09G 2320/0666* (2013.01); *G09G 2354/00* (2013.01)

(58) Field of Classification Search
CPC ........... G09G 3/344; G09G 2320/0252; G09G 2310/04; G09G 2310/06; G09G 2310/08; G09G 2340/16; G06F 3/03545
See application file for complete search history.

(56) References Cited

U.S. PATENT DOCUMENTS

| | | |
|---|---|---|
| 8,264,454 B2 | 9/2012 | Kim et al. |
| 9,349,327 B2 | 5/2016 | Lee et al. |
| 9,679,523 B2 | 6/2017 | Lee et al. |
| 2010/0271313 A1* | 10/2010 | Low ........................ G09G 3/344 345/173 |
| 2012/0188272 A1* | 7/2012 | Wang ..................... G09G 3/344 345/629 |

OTHER PUBLICATIONS

"E-paper-mode-declaration" Available Online at: https://www.google.com/url?sa=t&rct=j&q=&esrc=s&source=web&cd=&ved=2ahUKEwjut_CFqpL6AhXULkQIHTIABKEQFnoECAoQAQ&url=https%3A%2F%2Fwww.waveshare.net%2Fw%2Fupload%2Fc%2Fc4%2FE-paper-mode-declaration.pdf&usg=AOvVaw1yHpGIKeLGbyV0Tb0jH0cl, Accessed from Internet on Sep. 13, 2022, 5 pages.

* cited by examiner

Primary Examiner — Priyank J Shah
(74) Attorney, Agent, or Firm — Kilpatrick Townsend & Stockton LLP

(57) ABSTRACT

Techniques for low latency updating of an electrophoretic panel are described. According to such techniques, pixels may be continuously scanned out instead of buffering and updating at fixed scanning slots. In an example, a controller of a device loads, before receiving update data associated with a pixel of an electrophoretic panel, a LUT into a memory accessible to a LUT hardware module. After the LUT is loaded into the memory, the controller receives the update data indicating a color change to the pixel and associates the update data with the LUT. Based at least in part on the update data and the LUT, the controller determines waveform data corresponding to the color change and causes an output on the electrophoretic panel based at least in part on the waveform data.

20 Claims, 13 Drawing Sheets

US 11,978,413 B1

LOOK-UP TABLE ACTIVATION FOR AN ELECTROPHORETIC PANEL

BACKGROUND

Electrophoretic panels can be used in different types of devices. For example, an e-reader device can include an electrophoretic panel. The electrophoretic panel supports good readability in bright ambient light, such as in the sunlight. The electrophoretic panel also supports low power consumption. As such, the e-reader device can be battery powered and used for different applications including displaying static contents (e.g., e-books) and dynamic content (e.g., animations).

BRIEF DESCRIPTION OF THE DRAWINGS

Various embodiments in accordance with the present disclosure will be described with reference to the drawings, in which.

DETAILED DESCRIPTION

Figure 1:
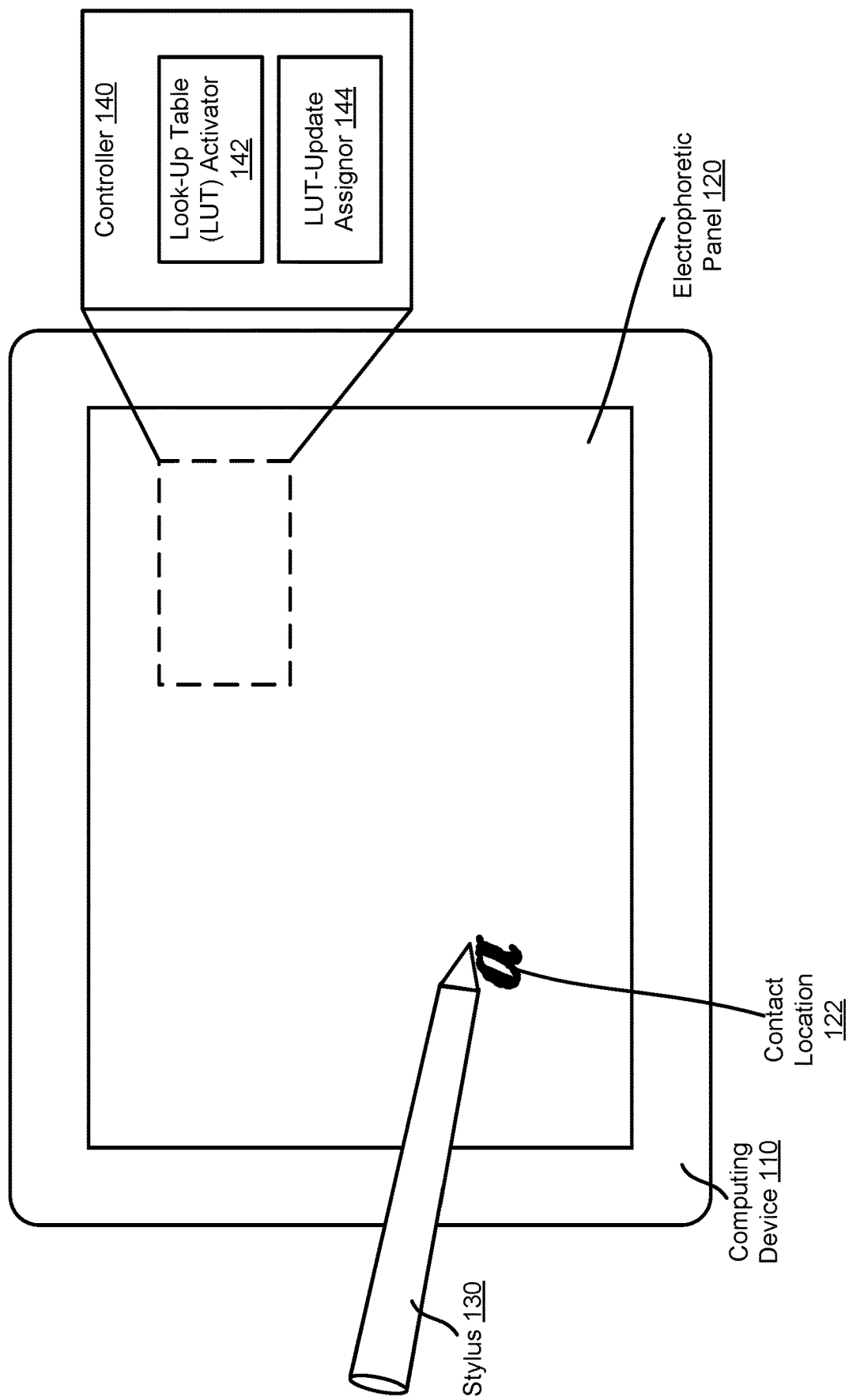
FIG. 1 illustrates an example of a computing device that includes an electrophoretic panel, according to embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure relate to, among other things, presenting content on an electrophoretic panel of a computing device. The electrophoretic panel can include multiple pixels. A look-up table (LUT) hardware module of the computing device can determine waveform data based on a waveform look-up table (waveform LUT, or in the interest of brevity, LUT), where the waveform data is used to control the pixel colors. For a pixel (or, similarly, multiple pixels), the waveform data can indicate a driving voltage to be applied to the pixel such that a particular pixel color is presented at the electrophoretic panel. In an example, the electrophoretic panel is updated at a particular frame rate (e.g., between 50 Hz and 120 Hz, such as 85 Hz). The pixel is scanned out at the particular frame rate, where the scan out includes applying the driving voltage to the pixel. An update may be determined (e.g., based on receiving a stylus input at the electrophoretic panel) and may necessitate a change to the pixel color (and correspondingly a change to the driving voltage applied to the pixel). To reduce the latency associated with effectuating this change, a LUT can be activated by loading into a memory accessible to the LUT hardware module prior to the update. The waveform data can also be loaded into the memory. After the update is determined, the update and the activated LUT are associated together. This association enables using the current value and next color value of the pixel in a look-up of the activated LUT. This look-up indicates a pointer that is then used to determine, from the waveform data, particular waveform data to be used. Upon the scanning out of the pixel, a particular driving voltage is applied to the pixel according to the particular waveform data.

To illustrate, consider an example of an e-reader device with a stylus. The e-reader device can execute an application that supports stylus input for handwriting on an electrophoretic panel of the e-reader device. The e-reader device can include a plurality of LUTs. A writing mode of the e-reader device is enabled, allowing stylus input for handwriting. During a frame "n−1," a LUT of the plurality of LUTs is activated, whereby the LUT and waveform data for black and white content presentation (e.g., corresponding to a "direct update" (DU) waveform) are loaded in a memory of a LUT hardware module of the device. This activation can be performed independently of any stylus input. For instance, this activation can occur before receiving a stylus input for a handwriting update. During the next frame "n," stylus input for a handwriting update is received at a location on the electrophoretic panel. The application indicates, among other things, the location (e.g., as a subset of pixels of the electrophoretic panel) and the color changes (e.g., from white to black such that the handwriting update can be shown as a black trace at that location on the electrophoretic panel). The corresponding update data is associated with the LUT, whereby each pixel of the subset is represented in a working buffer by its current pixel color value and its next pixel color value and is associated, in the working buffer, with an identifier (ID) of the LUT. The ID is used to determine the LUT. The current pixel color value and the next pixel color value of a pixel are used in a look-up of this LUT, resulting in a pointer to specific waveform data. This specific waveform data is sent to a panel controller of the electrophoretic panel that then uses it in the next scan out of the pixel, which may occur during the frame "n."

Embodiments of the present disclosure provide many technological advantages. For example, the latency associated with presenting a content update on an electrophoretic panel can be reduced. As further explained in the next figures, this latency can be reduced by half (e.g., from up to frames to up to one frame). As such, the overall user experience can be improved. In particular, in the use case of a stylus, the latency between a contact of the stylus with the electrophoretic panel and the presentation of the relevant content at the contact location can be significantly reduced to a point where it may not be detectable to a user.

Various embodiments are described herein in connection with a stylus use case. However, the embodiments are not limited as such. Instead, the embodiments similarly and equivalently apply to other use cases that may not involve a stylus. In particular, the embodiments apply to any use case related to a pixel-based update of an electrophoretic panel (e.g., to updating particular pixels of the electrophoretic panel rather than updating the entire content presented on the electrophoretic panel). For instance, an animation can be presented at a location of electrophoretic panel, where the animated content changes from one frame to the next at the location. In this use case, a LUT activated during a frame "n−1" can be associated with the updated content during the next frame "n" such that this updated content can be presented on electrophoretic panel at a lower latency.

FIG. 1 illustrates an example of a computing device 110 that includes an electrophoretic panel 120, according to embodiments of the present disclosure. In the illustration of FIG. 1, electrophoretic panel 120 can be used for static and dynamic content presentations and can be configured as an input and output interface. A stylus 130 can be used as an input device, where contact between the stylus 130 and the electrophoretic panel 120 can cause an operation of the computing device 110, and where the electrophoretic panel 120 can present an output of the operation. A controller 140 of the computing device 110 can control the presentation of the output on the electrophoretic panel 110. The control can involve updating the output at a particular frame rate (e.g., 85 Hz) by activating a LUT hardware module in a frame "n−1" and assigning an output update processed during a next frame "n" to this activated LUT hardware module.

In an example, the computing device 110 includes any type of device suitable for operations by a user and that includes the electrophoretic panel 110, the controller 140, one or more memories, one or more processors, and one or more input/output (I/O) interfaces. For instance, the computing device 110 can be an e-reader device, a e-display device, a smart sign, an internet of things (IoT) device, or any other suitable device.

Generally, the computing device 110 can execute an application usable for presenting content. For instance, the application can be any type of application suitable for controlling a functionality of the computing device 110. The functionality can be an input function, an output functionality, or an I/O functionality. For instance, the application can be a text application (or a handwriting application) that allows free form text input on the electrophoretic panel 120 (e.g., a notepad application), where the corresponding text can be presented on the electrophoretic panel 120. The application can also or alternatively be a drawing application that allows free form drawing input on the electrophoretic panel 120 (e.g., a paint application, a sketch application, etc.), where the corresponding drawing can be presented on the electrophoretic panel 120. In another illustration, the application can be a media application that allows the presentation of animated content (e.g., a video file, a graphic file, etc.). The application can also be an e-book application.

The stylus 130 can be any type of suitable input device having a tip that can contact the electrophoretic panel 120 and be used to control the input. For instance, the stylus 130 can be a pen-shaped instrument having a tip detectable by a touch controller. This pen can be used to write, draw, or make selections on the electrophoretic panel 120. The touch controller can receive input data indicating detected contact points of the stylus 130 on the electrophoretic panel 120. Based on the input data, the touch controller generates output data indicating the corresponding pixels of electrophoretic panel 120.

A contact location 122 can be a location on the electrophoretic panel 120. This location can be a set of pixels (e.g., not limited to a single pixel) where contact is detected. Contact can be detected based on electrode-based sensing (e.g., resistive sensing, capacitive sensing, voltage sensing, pressure sensing, etc.) or any other type of sensing that the electrophoretic panel 120 supports. The number of pixels can depend on the amount of contact between the stylus 130 and the electrophoretic panel 120 and/or the change to the sensing. The data about the contact location 122 can include, among other things, the coordinates of the corresponding pixels in a coordinate system of the electrophoretic panel 120 (e.g., one with an origin at a particular position on the electrophoretic panel 120) and, possibly, sensed measurements. The application can receive the data and generates, based on this data, update data indicating the contact location 122, needed update, and a waveform type (e.g., supported by a LUT). For instance, referring back to the text application, the application can indicate the contact location 122, a black and white waveform to use for black and white handwriting (e.g., a DU waveform), and color changes (e.g., from black to white) of each pixel at the contact location 122. A color of a pixel can have a value from a range of values. In an example, the range is a binary range (e.g., a black color or a white color). In another example, the range can be a grayscale range (e.g., the pixel can have a grayscale color). In yet another example, the range can be a, red, green, blue (RGB) range (e.g., the pixel can have an RGB color).

As further illustrated in FIG. 1, the controller 140 includes, among other things, a look-up table (LUT) activator 142 and a LUT-update assignor 144. Each of these two components can be implemented in specialized hardware (e.g., a field programmable gate array (FPGA)) or program code executing on generalized hardware (e.g., a general purpose processor (GPP)).

The LUT activator 142 can activate a LUT for use in controlling the rendering of content on the electrophoretic panel 120. As further described in the next figures, a LUT can be activated prior to receiving or determining any update that needs to be output on the electrophoretic panel 120. For instance, the LUT can be activated during a frame (e.g., frame "n−1"), whereas the update may be received during the next frame (e.g., frame "n").

The LUT-update assignor 144 can determine, during the next frame (e.g., frame "n"), an update at a contact location, where the update corresponds to update data generate by the application. The LUT-update assignor 144 can assign the update to the already activated LUT. The assignment can include storing an identifier of the LUT in association with pixel data (e.g., current and next color values) in a working buffer.

depending on the contact location and the scan out pattern, during the next frame (e.g., frame "n"), the update can be presented on the electrophoretic panel 120. For example, for a pixel that is at the contact location, its pixel data is used to identify, from the working buffer, the LUT that has already been activated and assigned thereto, and to determine the waveform data indicated by the LUT to drive the voltage of the pixel. This waveform data can be sent immediately to a panel controller of electrophoretic panel 120 that then controls the driving voltage of the pixel accordingly during the scan out of the pixel.

In the illustration of FIG. 1, the stylus 130 is used to write a letter (illustrated as a letter "a"). The contact location 122 of the stylus 130 on the electrophoretic panel 120 is detected during a frame "n" and can correspond to writing a portion of the letter. The controller 142 receives, during the frame "n," update data of the application indicating, among other things, the contact location 122 and the color changes of pixels at the contact location 122 from white to black. The LUT previously activated (e.g., during frame "n−1") is used to control these pixels of the electrophoretic panel 120 such that their color is shown as black during the frame "n."

Although FIG. 1 describes contacts between the stylus 130 and the electrophoretic panel 120, the embodiments of the present disclosure are not limited as such. A contact is an example of a type of interaction between a stylus and an electrophoretic panel. Other types of interactions are possible and can include contactless interactions. An interaction represents an action that can be initiated using a stylus and that can be detected as input to a computing device, where this input may cause an output to be displayed on an electrophoretic panel of the computing device. The type of action and/or detection can depend on the underlying hardware and/or software technology of the stylus, the computing device, and the electrophoretic panel, where this technology can support contact-based, optical-based, magnetic-based, and/or wireless communication-based interactions. For example, the embodiments similarly apply to a contactless input, where a location on the electrophoretic panel can be detected without necessarily a contact being received at that location. For instance, the computing device 110 and/or the stylus 130 can support contactless-based sensing, where a location on the electrophoretic panel 120 can be detected when the stylus is at some predefined distance (e.g., 5 millimeters) away from the electrophoretic panel 120. Additionally, although FIG. 1 describes the use of the stylus 130, the embodiments of the present disclosure are not limited as such. Instead, the embodiments similarly apply to any other type of input objects which can be, for instance, a user finger or multiple user fingers.

Figure 2:
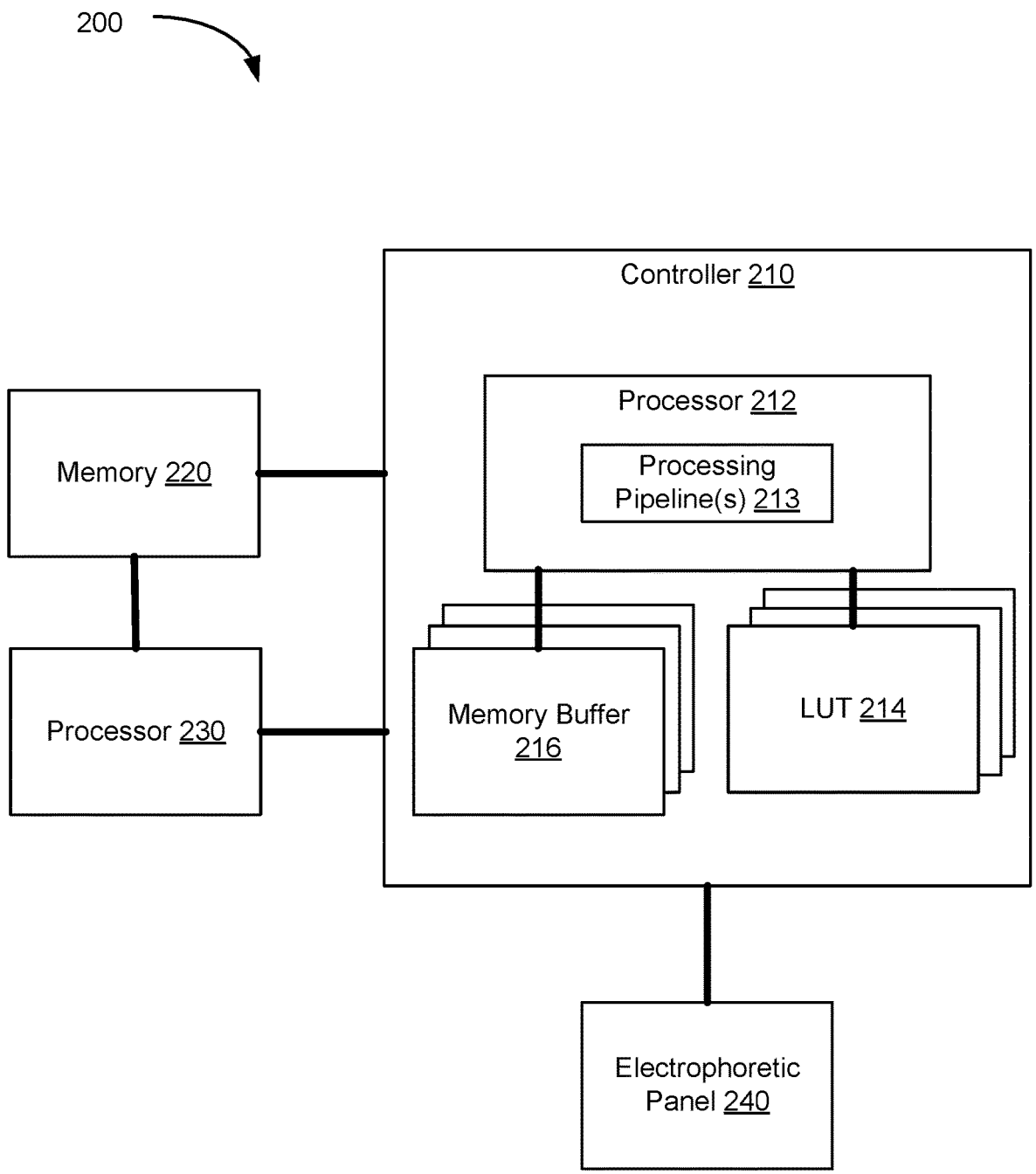
FIG. 2 illustrates an example of components of a computing device that includes an electrophoretic panel, according to embodiments of the present disclosure.

FIG. 2 illustrates an example of components of a computing device 200 that includes an electrophoretic panel, according to embodiments of the present disclosure. The computing device 210 is an example of the computing device 110 of FIG. 1 and includes, among other things, a controller 210, a memory 220, a processor 230, and an electrophoretic panel 240. The controller 110 can control the rendering of content on the electrophoretic panel 240. The memory 220 can store program code for an application (e.g., a text application), and content files (e.g., image files, video files, animation files, etc.). The processor 230 can be implemented as a central processing unit (CPU) for executing the program code stored in the memory 220. The controller 210, or one or more of its components, can be implemented as specialized hardware or program code executing on generalized hardware.

In an example, the electrophoretic panel 240 includes electrophoretic cells, each of which can correspond to a pixel. The electrophoretic cells can be arranged in a grid to form a panel size of X×Y pixels. On the front viewing side of the electrophoretic panel 240 (e.g., the side viewed by a user), a transparent common electrode can be disposed (e.g., formed by using an indium, tin and oxide (ITO) layer). On the opposing side, a substrate is disposed and includes discrete pixel electrodes. Each pixel electrode defines an individual pixel of the electrophoretic panel 240. Further, an electrophoretic fluid is filled in each of the electrophoretic cells (e.g., between the common electrode and a pixel electrode). The electrophoretic fluid includes charged particles. The movement of the charged particles in an electrophoretic cell is determined by the voltage potential difference applied to the common electrode and the pixel electrode associated with the electrophoretic cell in which the charged particles are filled.

The charged particles may be positively charged. In this case, the charged particles are drawn to the pixel electrode or the common electrode, whichever is at an opposite voltage potential from that of the charged particles. Alternatively, the charged particles may be negatively charged. The charged particles may be light or dark in color (e.g., white or black) and are dispersed in an electrophoretic fluid that is light in color to provide sufficient visual contrast.

Additionally or alternatively, the electrophoretic fluid may have a transparent or lightly colored solvent or solvent mixture with charged particles of contrasting colors and carrying opposite charges dispersed therein. For example, there may be white particles which are positively charged and black particles which are negatively charged, and the two types of particles are dispersed in the electrophoretic fluid.

A waveform voltage can indicate a sequence of driving voltages over time. A driving voltage can refer to the voltage potential difference experienced by charged particles in an electrophoretic cell. The driving voltage is the potential difference between the voltage applied to the common electrode and the voltage applied to the pixel electrode. As an example, in a single particle type system, positively charged black particles are dispersed in a white fluid. When zero voltage is applied to a common electrode and a larger, positive voltage is applied to a pixel electrode, the driving voltage is the higher, positive voltage This driving voltage moves the positively charged black particles to be near or at the common electrode (e.g., the viewing side) and as a result, a black color is visible to a viewer. In comparison, when a zero voltage is applied to the common electrode and a smaller, negative voltage is applied to the pixel electrode, the driving voltage in this case would be the smaller, negative voltage. The positively charged black particles are then moved to rear side (e.g., the side opposite to the viewing side), causing the white color of the electrophoretic fluid to be seen through the viewing side. Depending on a targeted transition for a pixel and/or how fast the targeted transition needs to be, a sequence can be a sequence of one driving voltage to apply for a single transition or a sequence of multiple driving voltages to apply for multiple transitions until the targeted transition is achieved.

When a pixel is driven from one color state to another color state, a voltage waveform is applied to the pixel (e.g., to at least the pixel electrode). The voltage waveform includes a sequence of driving voltages. The timing of this sequence and voltage potentials can control how fast the color of the pixel can change and the end color that is shown by controlling the movement of the charged particles.

While black and white colors ("first" and "second" colors) are used in the application for illustrative purposes only. Other colors and/or number of colors can be used, as long as such colors have sufficient visual contrast. An intermediate color is a color between the first and second colors. The intermediate color has different degrees of intensity on a scale. Using the gray color as an example, it may have a gray scale of eight, sixteen, sixty-four, two-hundred fifty-six, or some other scale.

In a gray scale of sixteen, gray level "0" (G0) may be the full black color and gray level "15" (G15) may be the full white color. Gray levels "1" through "14" (G1-G14) are gray colors ranging from dark to light.

Content presented on the electrophoretic panel 240 during a frame can be formed of a large number of pixels and when this content is updated during a next frame, a voltage waveform that includes a sequence of driving voltages is applied to each pixel. For example, a pixel in the current frame may have a G1 color and this pixel in the next frame is updated to have a G7 color. For this color update to be shown in the next frame, a voltage wave form that drives the color fro G1 and G10 is applied to the pixel.

In an example, the controller 210 can include multiple LUTs. In FIG. 2, each LUT is referred to with element number 214. The LUT 214 can indicate voltage waveforms that can be used to control the pixel. For instance, the LUT 214 indicates, for each voltage waveform, waveform data that indicates the sequence of driving voltages that can be applied to each pixel.

An example voltage waveform is a black and white waveform (also referred to as a DU waveform). For this waveform, the LUT 214 can indicate waveform data to drive pixels from black to black, from black to white, from white to white, and from white to black (e.g., given the two color states, the waveform data indicates "2×2=4" driving voltage transitions). Additionally or alternatively, the black and white waveform can drive pixels from any grayscale level to black or white. In the case of a sixteen grayscale colors, the DU waveform can indicate "16×2=32" driving voltage transitions.

Another example voltage waveform is a grayscale waveform with sixteen levels of grayscale (also referred to a GL16 waveform). For this waveform, the LUT 214 can indicate waveform data to drive pixels from any G0-G15 level to any G0-G15 level (e.g., given the two color states, the waveform data indicates "16×16=256" driving voltage transitions). Other possible voltage waveforms can be indicated by the LUT 214 including, an initialization mode (INIT) waveform for erasing and replacing a content presentation on the electrophoretic panel with a blank presentation (e.g., a white e-paper), a grayscale clearing (GC16) waveform (used to update the full electrophoretic panel 240 and provide a high image quality), a grayscale sparse update (GLR 16 or GLD16) waveform (used in conjunction with an image preprocessing algorithm to update sparse content on a white background with reduced flash and reduced image artifacts), and/or a black and white animation (A2) waveform (used in a fast, non-flash update mode for fast paging turning or black/white animation).

Additionally, the controller 210 can include a processor 212. The processor 212 can be a timing controller that implements a set of processing pipelines 213. One of such processing pipelines 213 can be a pixel processing pipeline.

Generally, first content is presented on the electrophoretic panel 240 during a first frame. The first content is to be updated such that second content is presented during a second frame after the first frame. The difference between the first content and the second content can be a content update between the first frame and the second frame.

In one example, the content update is applicable to the entire electrophoretic panel 240. In this case, a processing pipeline for refreshing the entire electrophoretic panel 240 can be used.

In another example, the content update is applicable to a location on the electrophoretic panel 240 (e.g., the contact location 122 of FIG. 1). In this example, the pixel processing pipeline can be used to update only the pixels (e.g., by controlling the sequence of driving voltages applied to each of such pixel in the transition from the first frame to the second frame).

Different techniques exist for determining the content update. In one example technique, the first content is stored in a first memory buffer. The second content is received from the application executed by the processor 230 and is stored in a second memory buffer. Each of the two memory buffers can be image buffers and can be part of the set of memory buffers 216 of the controller 210. The processor 212 can compare the first content and the second content to determine the content update. In another example technique, the application generates update data that indicates the content update, and this update data is received by the processor 212. In both cases, the processor 212 stores the update data in a third memory buffer (which can be referred to as a working buffer), which can also be part of the set of memory buffers 216.

A processing pipeline can also use different techniques for rendering the content update. One example technique is a continuous LUT activation technique. As further illustrated in the next figures, the continuous LUT activation technique can reduce the worst latency by half by activating a LUT in each frame such that updates can be scanned out as soon as they are assigned to an activated LUT. In this example, the continuous LUT activation technique can implement the functionalities of the LUT activator 142 and LUT-update assignor 144 described in FIG. 1. In particular, during the first frame (e.g., before the content update is received and determined), a LUT is activated. During the second frame (e.g., during which the content update is received and determined), the processor 212 associates the already the update data with the already activated LUT. Given the LUT, the processor 212 can determine the particular sequence of driving voltages to apply to each pixel indicated by the update data such that the color of this pixel can be updated from the first frame to the second frame. The sequences of driving voltages of the different pixels are then sent to electrophoretic panel 240 to be applied to the pixels. Accordingly, the voltages at the pixel electrodes of these pixels are changed between the first frame to the second frame such that the color(s) of the pixel(s) are changed to reflect a change to the content presentation at the location on the electrophoretic panel 240.

Other operations can be included in a processing pipeline. For example, in the pixel processing pipeline, pixel operations can be performed including determining the pixels that correspond to the location of the content update on the electrophoretic panel 240, applying a dither operation, applying a rotate operation, detect pixel collisions, combine pixels that do not collide, perform and report a histogram analysis, among other operations.

Figure 3:
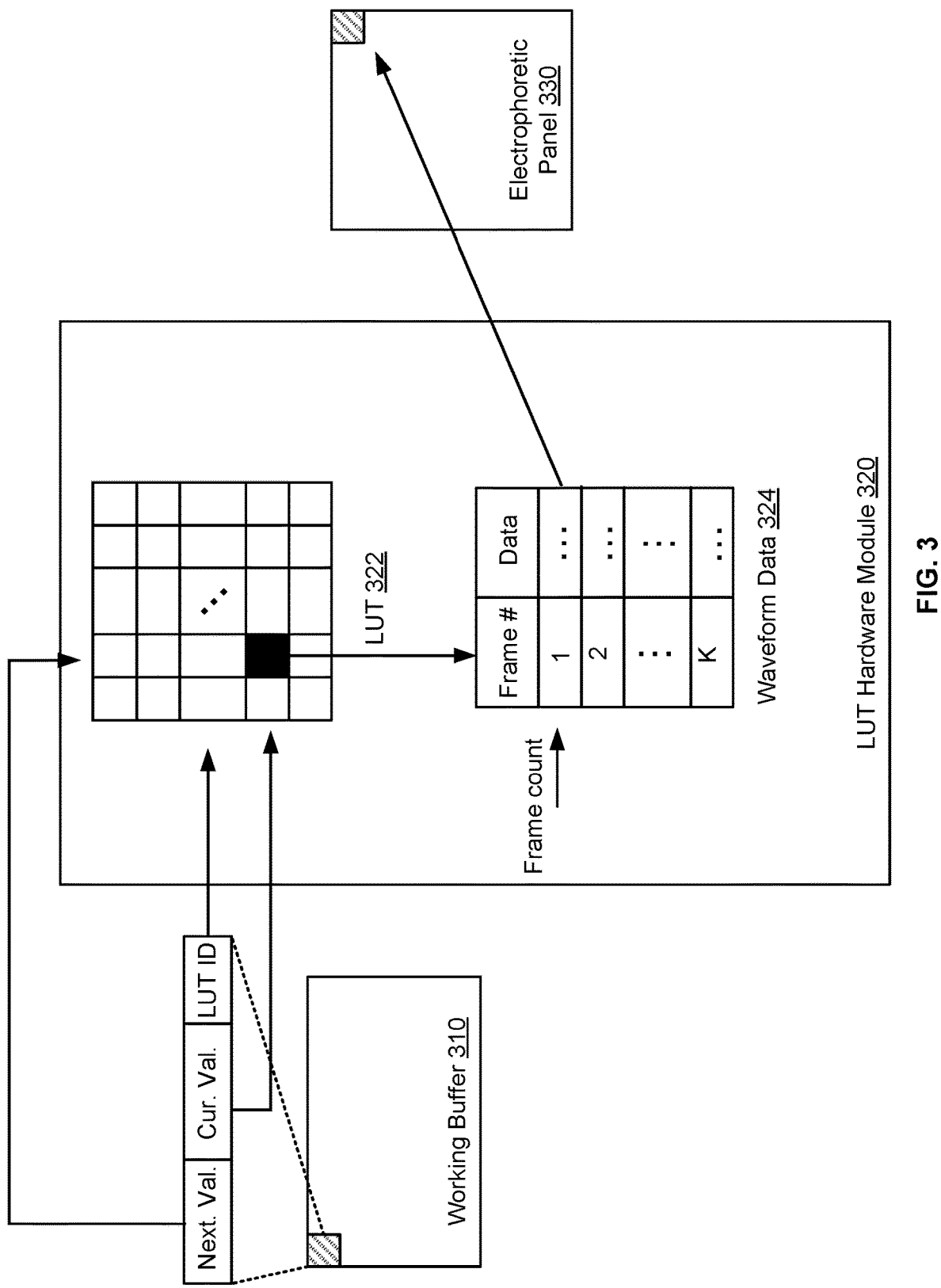
FIG. 3 illustrates an example of a look-up table (LUT) activation, according to embodiments of the present disclosure.

FIG. 3 illustrates an example of a LUT activation, according to embodiments of the present disclosure. As illustrated, a computing device, such as the computing device 200 of FIG. 2, can include a working buffer 310, a LUT hardware module 320, and electrophoretic panel 330. The working buffer 310 and the LUT hardware module 320 can be components of a controller that implements a continuous LUT activation technique, such as the controller 210 of FIG. 2.

In an example, activating a LUT includes loading a LUT 322 (e.g., a waveform look-up table) and waveform data 324 in a memory(ies). The memory(ies) can be accessible to the LUT hardware module 320 or can be included in the LUT 320. The waveform data 324 can be organized as waveform data entries, where each entry can correspond to a frame. Each waveform data entry can be associated with a frame number and can indicate specific waveform data to use in association with the frame number. There may be "K" frame numbers. The LUT 320 (or another component of the controller) can maintain a frame count. Upon activation, the frame count is "1" and corresponds to the first waveform data entry in the waveform data entries.

Given a current value and a next value of a pixel, the LUT 322 can be looked up to determine a pointer that points to specific waveform data within the waveform data entry corresponding to the frame count. For instance, the rows and columns of the LUT 322 correspond to the possible current pixel value and the possible next pixel value, respectively.

In operation, the LUT 322 is activated, whereby the frame count is initialized to "1." A pixel is represented in the working memory buffer by different pieces of data. In the illustration of FIG. 3, this representation is shown with a dashed square and includes three pieces of data: the next value of the pixel, the current value of the pixel, and an identifier of the LUT 322 (shown as a LUT ID). The next value indicates the color value to which the pixel should be changed. The current value indicates the current color value of the pixel from which the change should start. The LUT ID indicates a LUT with which the pixel is associated (e.g, the LUT assigned to the pixel). In the illustration of FIG. 3, the LIT ID identifies the LUT 322.

The LUT hardware module 320 can perform a look-up operation that uses the LUT ID, the current value, and the new value. For instance, the look-up operation involves using the LUT ID to identify the LUT 322 The look-up operation can also involve using the next value and the current value to look up the identified LUT 322. This look-up results in a pointer. The frame count is used to identify a specific waveform entry from the waveform data 324, and the pointer is used determine the specific waveform data from the waveform data entry to use in order to drive the voltage of the pixel in support of the color change. This specific waveform data indicates a set of driving voltages and is sent by the LUT hardware module 320 to a panel controller of the electrophoretic panel 330 to control the driving voltage of the pixel during a scan out of the pixel (e.g., at the pixel electrode and/or the common electrode). The pixel is shown in FIG. 3 with a dashed square at the top-right side of the electrophoretic panel 330 for illustrative purposes.

Figure 4:
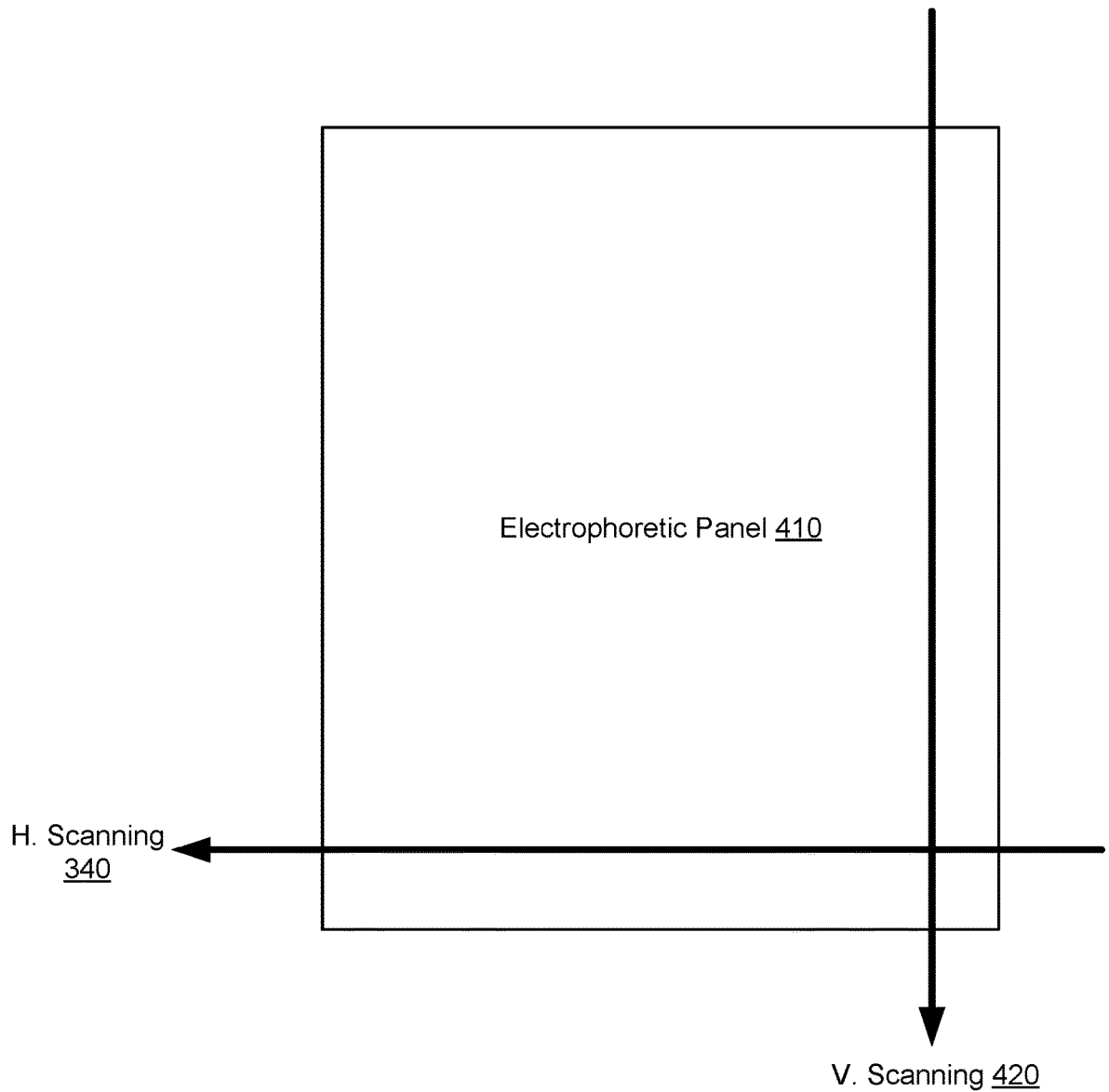
FIG. 4 illustrates an example of a scan out of an electrophoretic panel, according to embodiments of the present disclosure.

FIG. 4 illustrates an example of a scan out of an electrophoretic panel 410, according to embodiments of the present disclosure. The scan out can be performed in each frame so that updates can be processed, whereby the pixels are controlled according to a control sequence indicating by the scan out. Controlling a pixel can involve applying a voltage waveform to drive the pixel and achieve a particular pixel color, as described herein above. In the illustration of FIG. 4, the scan out is a top-to-bottom, right-to-left scan out, although other scan out patterns are possible can vary from panel to panel and can be changed in some panels. In particular, during a frame, the top-right pixel of the electrophoretic panel 410 is controlled first (also referred to as scanned out first) and the bottom-left pixel of the electrophoretic panel 410 is controlled last according to a vertical scanning 420 and a horizontal scanning 430.

In an example, the electrophoretic panel 410 includes a grid of pixels. The pixels are arranged in lines (e.g., along the vertical or Y direction) and in rows (e.g., along the horizontal or X direction). The vertical scanning 420 refers to scanning out pixels on a line-basis. In particular, pixels that belong to the same line are scanned out. A pixel positioned higher in this line (e.g., closer to the top of electrophoretic panel 410) is scanned out before a pixel positioned lower in this line (e.g., closer to the bottom of the electrophoretic panel 410). The horizontal scanning 430 refers to scanning out pixels on a row-basis. In particular, after pixels that belong to a line are scanned out according to the vertical scanning 420, the pixels of the next line (e.g., one that is closer to the left side of the electrophoretic panel 410) are then scanned out also according to the vertical scanning 420. As such, a top pixel of the right-most line is scanned out before a lower pixel of the right-most line is scanned out. And after this right-most line is scanned out, the next line to the left of it is scanned out, where the top pixel of this next line is scanned out before a lower pixel of this next line is scanned out, and so on and so forth.

The top-to-bottom, right-to-left scan out is one example of scan out. Other scan out types are possible including, for instance, a bottom-to-top, left-to-right scan out, or a zigzag scan out.

Figure 5:
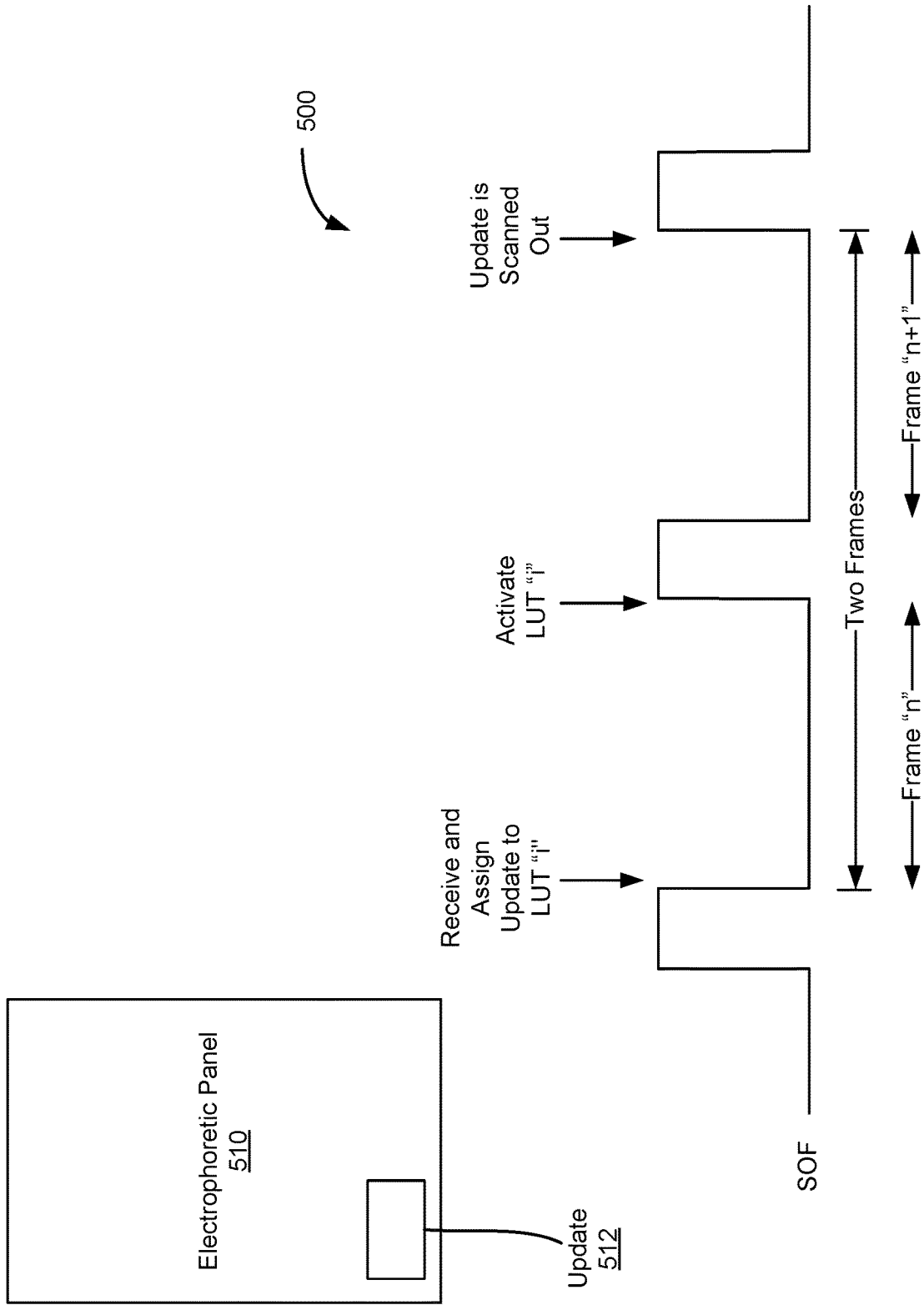
FIG. 5 illustrates an example of a timing diagram that relates to receiving an update to an electrophoretic panel, activating a LUT, and presenting updated content on the electrophoretic panel, according to embodiments of the present disclosure.

FIG. 5 illustrates an example of a timing diagram 500 that relates to receiving an update 512 to an electrophoretic panel 510, activating a LUT, and presenting updated content on the electrophoretic panel 510, according to embodiments of the present disclosure. The timing diagram 500 can be implemented by a controller (e.g., the controller 210 of FIG. 2) and corresponds to a non-continuous LUT activation technique.

The update 512 can correspond to a location on the electrophoretic panel 510 (e.g., a bottom left region of the electrophoretic panel 510 in the illustration of FIG. 5). The electrophoretic panel 510 can be scanned out following a top-to-bottom, right-to-left scan out. A panel controller of the electrophoretic panel 510 can generate a start of frame (SOF) interrupt (e.g., a signal sent by the panel controller using a particular register) at the beginning of each frame. This SOF interrupt can be received by the controller and used for synchronizing the control of the content updating with the actual content rendering on the electrophoretic panel 510.

A frame can be a duration of time between two SOF interrupts. During the frame, the scan out is performed. At the beginning of the frame, the top top-right pixel of the electrophoretic panel 510 is scanned out first. At the end of the frame, the bottom-left pixel of the electrophoretic panel 510 is scanned out last. The other pixels of the electrophoretic panel 510 are scanned out according to the scan out sequence (e.g., top-down along each line, and right-to-left across the lines).

In an example, the non-continuous LUT activation technique involves the controller receiving and assigning the update 512 to a LUT "i" during a frame "n." This update 512 is received at the electrophoretic panel 510 prior to the scanning out of the pixels that correspond to the location of the update 512. Receiving the update 512 can include receiving, at the beginning of the frame or sometime during the frame, update data that indicates the pixels. Assigning the update 512 can involve storing the update data in a memory buffer along with an indication of the LUT "i." "i" refers to the LUT that has been assigned to the update data.

Thereafter and during the frame "n," the controller activates the LUT "i." Now that LUT "i" is activated, LUT "i" and the waveform data can be used to render the update 512 on the electrophoretic panel 510. However, given the timing of the scan out of the pixels, this rendering cannot occur in the frame "n." Instead, the rendering occurs at the next scan out of these pixels during the next frame "n+1." As such, the time difference between the timing when the update 512 is received and the timing when the update 512 is rendered can span up to two frames. If the electrophoretic panel 510 is operated at a frame rate of, for instance, 85 Hz, this latency can be equal to up to 2×1/85 milliseconds (about 23.5 milliseconds). A 23.5 milliseconds latency can be noticeable to the human eye, which may impact the user experience.

Figure 6:
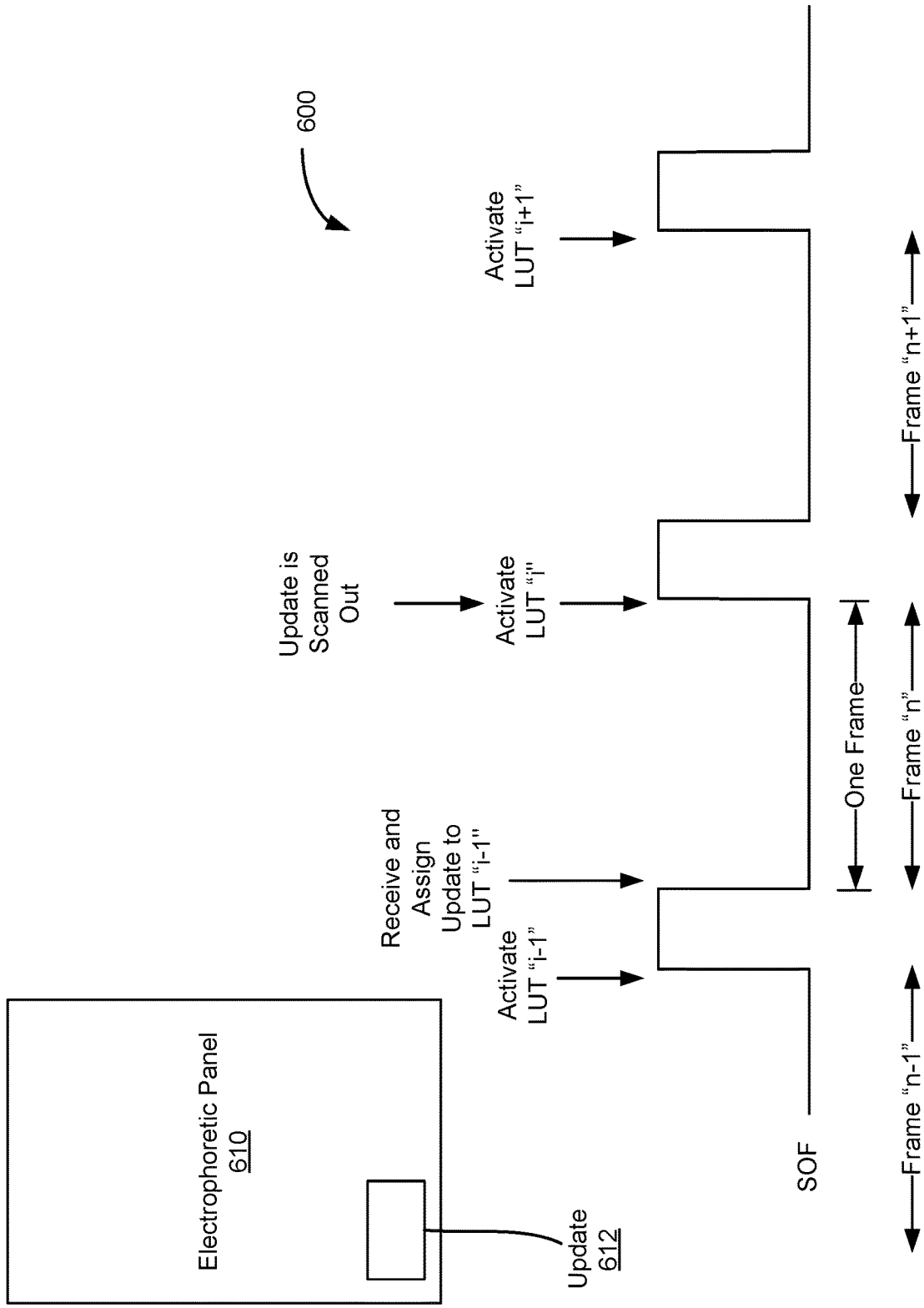
FIG. 6 illustrates an example of a timing diagram that relates to activating a LUT, receiving an update to an electrophoretic panel, and presenting updated content on the electrophoretic panel, according to embodiments of the present disclosure.

FIG. 6 illustrates an example of a timing diagram 600 that relates to activating a LUT, receiving an update 612 to an electrophoretic panel 610, and presenting updated content on the electrophoretic panel 610, according to embodiments of the present disclosure. The timing diagram 600 can be implemented by a controller (e.g., the controller 210 of FIG. 2) and corresponds to a continuous LUT activation technique.

The update 612 can correspond to a location on the electrophoretic panel 610 (e.g., a bottom left region of the electrophoretic panel 610 in the illustration of FIG. 6). The electrophoretic panel 610 can be scanned out following a top-to-bottom, right-to-left scan out. A panel controller of the electrophoretic panel 610 can generate an SOF interrupt at the beginning of each frame. This SOF interrupt can be used for synchronizing the control of the content updating with the actual content rendering on the electrophoretic panel 610.

A frame can be a duration of time between two SOF interrupts. During the frame, the scan out is performed. At the beginning of the frame, the top top-right pixel of the electrophoretic panel 610 is scanned out first. At the end of the frame, the bottom-left pixel of the electrophoretic panel 610 is scanned out last. The other pixels of the electrophoretic panel 610 are scanned out according to the scan out sequence (e.g., top-down along each line, and right-to-left across the lines).

In an example, the continuous LUT activation technique involves the controller activating LUT "i-1" during a frame "n-1." The LUT "i-1" can be activated regardless of whether an update is received during frame "i-1" or is anticipated to be received in frame "i."

Next, the controller receives and assigns the update 612 to the already activated LUT "i-1" during a frame "n." This update 612 is received at the electrophoretic panel 610 prior to the scanning out of the pixels that correspond to the location of the update 612. Receiving the update 612 can include receiving, at the beginning of the frame or sometime during the frame, update data that indicates the pixels. Assigning the update 612 can involve storing the update data in a memory buffer along with an indication of the LUT "i-1."

The scanning out of the pixels occurs during the frame n" after the update 612 have been received and assigned to the LUT "i-1." Accordingly, the presentation of the update 612 on the electrophoretic panel 610 is possible during the frame "n" (e.g., as part of the scan out in this frame). For instance, the scanning out of these pixels occurs near the end of the frame "n" (e.g., given their location being at the bottom-left of the electrophoretic panel 610). During the scan out, the pixels are driven using the LUT "i-1" (e.g., its waveform data).

As explained herein above, the waveform data can include different driving voltages (in the case of black-and-white handwriting, from black-to-black, black-to-white, white-to-black, and white-to-white). The specific waveform data to use per pixel (e.g., to transition a pixel from white to black) can be determined based on the update data per pixel. For instance, the update data indicates that the color of a pixel is to be transitioned from white to black. In this case, a sequence of voltage waveforms for the white-to-black transition of the pixel is determined from the activated LUT "i-1."

Accordingly, the time difference between the timing when the update 612 is received and the timing when the update 612 is rendered can span up to one frame. If the electrophoretic panel 610 is operated at a frame rate of, for instance, 85 Hz, this latency can be equal to up to 1/85 milliseconds (about 11.8 milliseconds). An 11.8 milliseconds latency can be much less noticeable to the human eye than a 23.5 milliseconds latency, which may improve the user experience.

Also during the frame "n," the controller activates the LUT "i." For example, near or at the end of the frame, the waveform data of the LUT "i" is retrieved and stored in a memory buffer. Here, the update data of the update 612 can indicate a waveform type. The LUT "i" can be selected according to the waveform type. Additionally or alternatively, given the application type or the enabled mode, the LUT "i" can be selected. Now that LUT "i" is activated, LUT "i" can be used to render any update received in the next frame "n+1."

Figure 7:
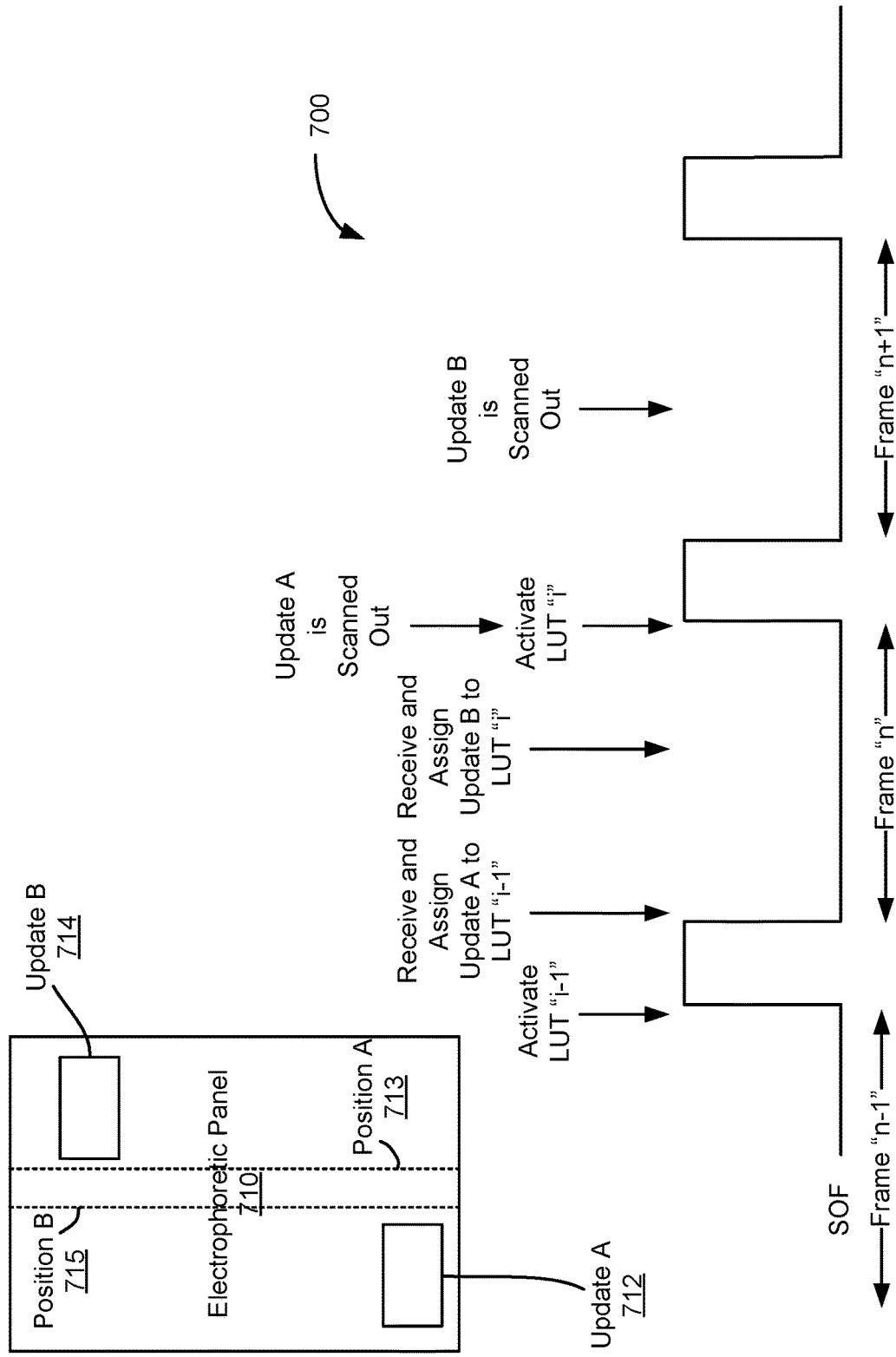
FIG. 7 illustrates an example of a timing diagram that relates to activating a look-up tables, receiving multiple updates to an electrophoretic panel, and presenting updated content on the electrophoretic panel, according to embodiments of the present disclosure.

FIG. 7 illustrates an example of a timing diagram 700 that relates to activating look-up tables, receiving multiple updates 712 and 714 to an electrophoretic panel 710, and presenting updated content on the electrophoretic panel 710, according to embodiments of the present disclosure. The timing diagram 700 can be implemented by a controller (e.g., the controller 210 of FIG. 2) and corresponds to a continuous LUT activation technique.

As described in connection of FIG. 6, the continuous LUT activation technique can involve activating a LUT "i-1" during a frame "n-1" for use with an update received during a next frame "n." Here, the continuous LUT activation technique can also involve determining whether the update received during frame "n" is to be assigned to the already activated LUT "i-1" such that the update can be presented during the frame "n" or to a next activated LUT "i+1" such that the update can be presented during the next frame "n+1." This determination can depend on the location of the update and the associating scan out timing. In particular, the update can be received at a first time (e.g., its timing is "t1"). Given the location of the update on the electrophoretic panel 710, the scan out of the location can occur at a second time (e.g., its timing "t2."). If the first time precedes the second time (e.g., "t1<t2,") the update can be assigned to the already activated LUT "i-1" such that the update can be presented during the frame "n." However, if the first time follows the second time (e.g., "t1>t2,") the update can be assigned to the next activated LUT "i" such that the update can be presented during the next frame "n+1." One advantage of this approach includes minimizing or eliminating the possibility of missing a frame.

FIG. 7 illustrates this location-based LUT-update assignment by illustrating two updates: update A 712 and update B 714. In this illustration, given the locations of the update A 712 and update B 714 and the related scan out timing, the update A 712 received in frame "n" is assigned to the LUT "i−1" and is rendered in the frame "n," whereas the update B 714 received in frame "n" is assigned to the LUT "i" and is rendered in the frame "n+1." For illustrative purposes, the two updates are shown as being received in a same frame "n." However, that may not be the case and these two updates can be received in different frames. Regardless of the frame during which each update is received, the processing of each update can be similar to the processing described herein next.

In an example, the update A 712 can correspond to a location on the electrophoretic panel 710 (e.g., a bottom left region of the electrophoretic panel 710 in the illustration of FIG. 7). The electrophoretic panel 710 can be scanned out following a top-to-bottom, right-to-left scan out. A panel controller of the electrophoretic panel 710 can generate an SOF interrupt at the start of each frame. This SOF interrupt can be used for synchronizing the control of the content updating with the actual content rendering on the electrophoretic panel 710.

A frame can be a duration of time between two SOF interrupts. During the frame, the scan out is performed. At the beginning of the frame, the top top-right pixel of the electrophoretic panel 710 is scanned out first. At the end of the frame, the bottom-left pixel of the electrophoretic panel 710 is scanned out last. The other pixels of the electrophoretic panel 710 are scanned out according to the scan out sequence (e.g., top-down along each line, and right-to-left across the lines).

In an example, the continuous LUT activation technique involves the controller activating LUT "i−1" during a frame "n−1." The LUT "i−1" can be activated regardless of whether an update is received during frame "n−1" or is anticipated to be received in frame "n."

Next, the controller receives and assigns the update A 712 to the already activated LUT "i−1" during a frame "n." This update A 712 is received at the electrophoretic panel 710 prior to the scanning out of the pixels that correspond to the location of the update A 712. In the illustration of FIG. 7, the position of the scan out (e.g., the line being scanned out) at the time of when the update A 712 is received is shown with a dotted line labeled as "position A 713."

Receiving the update A 712 can include receiving, at a point in time during the frame "n," update data that indicates the pixels. Assigning the update A 712 can involve storing the update data in a memory buffer (e.g., a working buffer). Further here, given the timing of the SOF interrupt indicating the frame "n" (e.g., the start or the end of this SOF interrupt) and the timing of the current scan out, the controller can determine a time interval between the start of the frame (or, equivalently, the end of the frame) and the current scan out timing. Given the location of the update A 712, the controller can determine whether the scan out of its location occurred already (e.g., its timing falls in the time interval between the start of the frame and the current scan out) or is to occur (e.g., its timing falls outside this time interval or in the time interval between the current scan out and the end of the frame). In the illustration of FIG. 7, the controller determines that the scan out of the update A's 712 location is to occur. Accordingly, the controller assigns the update A 712 to the already activated LUT "i−1." Accordingly, the presentation of the update A 712 on the electrophoretic panel 710 occurs during the frame "n" (e.g., as part of the scan out in this frame). For instance, the scanning out of these pixels occurs near the end of the frame "n" (e.g., given their location being at the bottom-left of the electrophoretic panel 710). During the scan out, the pixels are driven using the LUT "i−1" (e.g., its waveform data).

In addition during the frame "n," the controller receives and assigns the update B 714 to the LUT "i" to be activated during a frame "n" (e.g., near the end of this frame). This update B 714 is received at the electrophoretic panel 710 after the scanning out of the pixels that correspond to the location of the update B 714. In the illustration of FIG. 7, the position of the scan out (e.g., the line being scanned out) at the time of when the update B 714 is received is shown with a dotted line labeled as "position B 715."

Receiving the update B 714 can include receiving, at a point in time during the frame "n," update data that indicates the pixels. Assigning the update B 714 can involve storing the update data in a memory buffer. Further here, given the timing of the SOF interrupt indicating the frame "n" (e.g., the start or the end of this SOF interrupt) and the timing of the current scan out, the controller can determine a time interval between the start of the frame (or, equivalently, the end of the frame) and the current scan out timing. Given the location of the update B 714, the controller can determine whether the scan out of its location occurred already (e.g., its timing falls in the time interval between the start of the frame and the current scan out) or is to occur (e.g., its timing falls outside this time interval or in the time interval between the current scan out and the end of the frame). In the illustration of FIG. 7, the controller determines that the scan out of the update B's 714 location already occurred. Accordingly, the controller assigns the update B 714 to the to be activated LUT "i." Subsequently (e.g., near the end of the frame "n"), the LUT "i" is activated. Accordingly, the presentation of the update B 714 on the electrophoretic panel 710 occurs during the frame "n+1" (e.g., as part of the scan out in this frame). For instance, the next scanning out of these pixels occurs early on during the frame "n+1" (e.g., given their location being at the top-right of the electrophoretic panel 710). During the scan out, the pixels are driven using the LUT "i" (e.g., its waveform data).

FIGS. 8-12 illustrate flows for presenting content on an electrophoretic panel of a computing. The computing device can be any of the computing devices described herein above (e.g., the computing device 110 of FIG. 1 or the computing device 200 of FIG. 2). The operations of the flow can be performed by a controller of the computing device. The controller can be any of the controllers described herein above (e.g., the controller 210 of FIG. 2). While the operations are illustrated in a particular order, it should be understood that no particular order is necessary and that one or more operations may be omitted, skipped, performed in parallel, and/or reordered.

Figure 8:
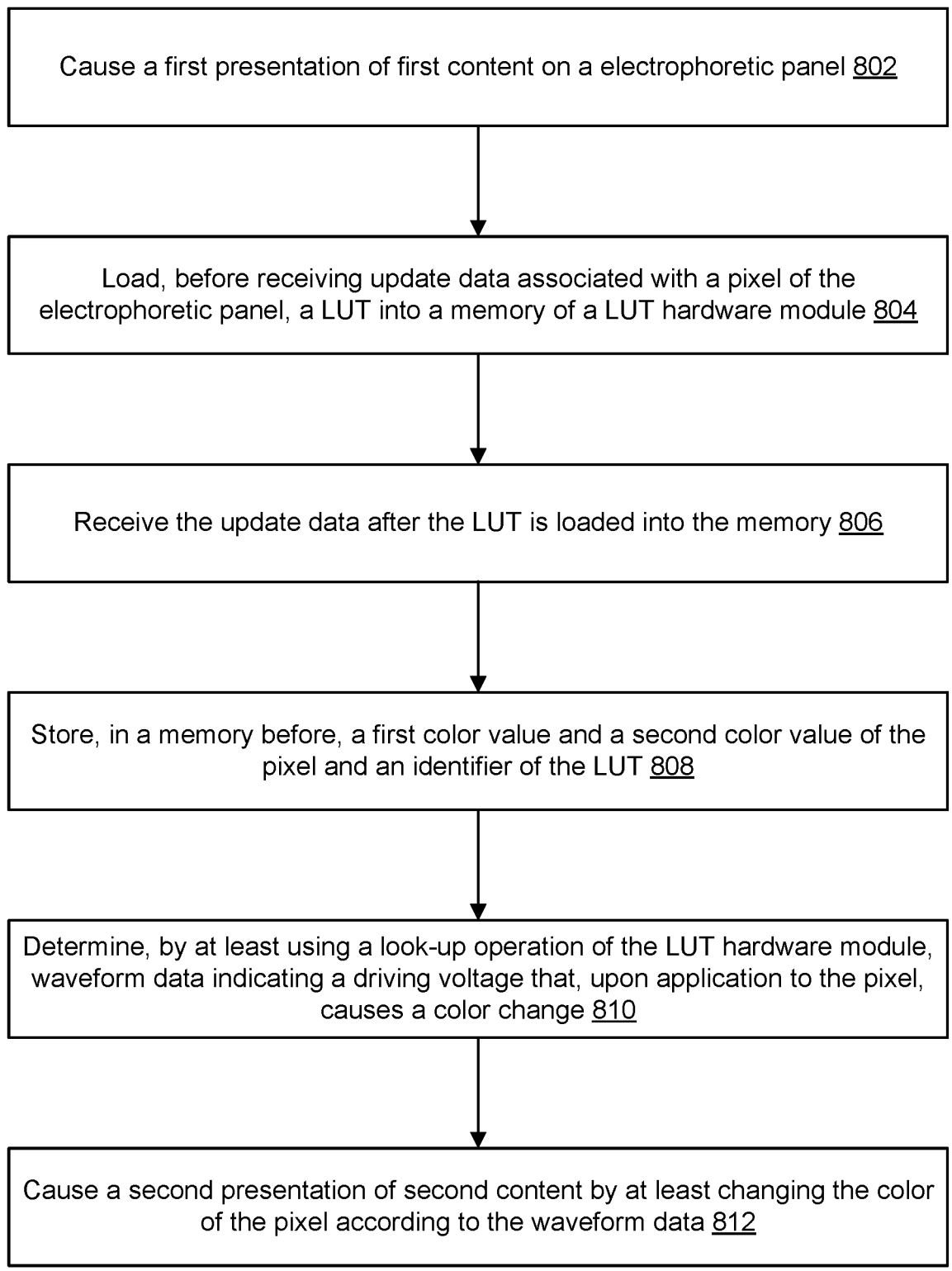
FIG. 8 illustrates an example of a flow for controlling content presentation on an electrophoretic panel, according to embodiments of the present disclosure.

FIG. 8 illustrates an example of a flow for controlling content presentation on an electrophoretic panel, according to embodiments of the present disclosure. In an example, the flow of FIG. 8 may start at operation 802, where the controller causes a first presentation of first content on an electrophoretic panel. A pixel of the electrophoretic panel is associated with a first color value in the first presentation. The pixels of the electrophoretic panel are controlled by driving voltages, where the voltage application results in a particular color presentation per pixel. The collection of the colors of the pixels across the electrophoretic panel corresponds to the first presentation of first content.

In an example, the flow of FIG. 8 may also include operation 804, where the controller load, before receiving update data associated with the pixel, a LUT into a memory of a LUT hardware module. For instance, the controller detects a start of a frame based on an SOF interrupt. Before the end of the frame, the controller can load the LUT into the memory.

In an example, the flow of FIG. 8 may also include operation 806, where the controller receives the update data after the LUT is loaded into the memory. The update data indicates a second color value of the pixel. For instance, the update data is received from an application in response to a user input at the electrophoretic panel (e.g., a stylus contact at a location on the electrophoretic panel, where the location includes the pixel). Other types of updates can be possible, such as an animation update.

In an example, the flow of FIG. 8 may also include operation 808, where the controller stores, in a memory buffer, the first color value, the second color value, and an identifier of the LUT. For example, the memory buffer can be a working buffer. The pixel is represented in the memory buffer by at least three pieces of information: the first color value, the second color value, and the identifier. The identifier indicates that the update is assigned to the already activated LUT.

In an example, the flow of FIG. 8 may also include operation 810, where the controller determines, by at least using a look-up operation of the LUT hardware module, waveform data indicating a driving voltage that, upon application to the pixel, causes a color change from the first color value to the second color value. The look-up operation uses the first color value, the second color value, and the identifier in a look-up of the LUT. For instance, the identifier is used to identify the LUT. The second value and the first value are then used to determine, from the LUT, a pointer to the waveform data.

In an example, the flow of FIG. 8 may also include operation 812, where the controller cause a second presentation of second content by at least changing the color of the pixel according to the waveform data. For instance, the controller can waveform data to a panel controller of the electrophoretic panel. The panel controller can determine, based on the waveform data, the driving voltage to apply to the pixel, thereby causing the pixel's color presentation to change from the first color value to the second color value. Similar controls can be applied to other pixels subject to the update.

Figure 9:
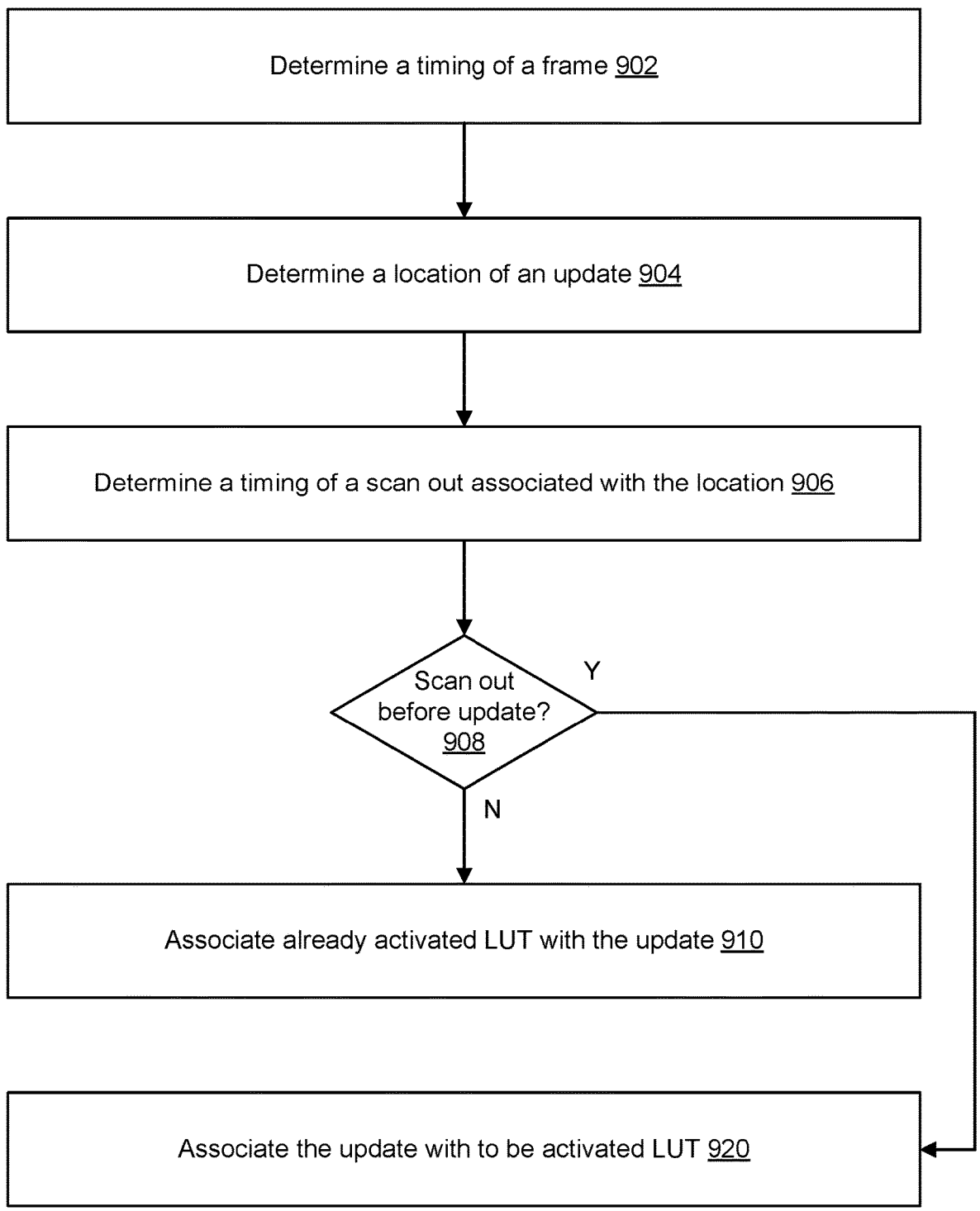
FIG. 9 illustrates an example of a flow for a location-based use of LUTs, according to embodiments of the present disclosure.

FIG. 9 illustrates an example of a flow for a location-based use of LUTs, according to embodiments of the present disclosure. In an example, the flow of FIG. 9 may start at operation 902, where the controller determines a timing of a frame. For instance, the controller receives an SOF interrupt of the panel controller. This SOF interrupt can indicate the start of a frame. The timing can be the time when the frame starts or the time when the frame is expected to end.

In an example, the flow of FIG. 9 may include operation 904, where the controller determines a location of an update. For instance, the location can correspond to particular pixels of the electrophoretic panel needing a color change. This location can be determined from location data received from the panel controller and/or update data received from an application.

In an example, the flow of FIG. 9 may include operation 906, where the controller determines a timing of a scan out associated with the location. For instance, the timing can depend on the location of the update and the type of scan out (e.g., top-to-bottom, right-to-left scan out). Given the location, the controller can estimate the start and/or the end of the scan out of the pixels that correspond to the location. To illustrate, consider the example of the electronic panel including a gird of ten lines and five rows. The frame rate is 100 Hz. As such, the total scan out time of the entire grid is 100 milliseconds. Each line scan out time is then 10 milliseconds. Given that each line includes five pixels, the pixel scan out time can be 2 milliseconds. If the location corresponds to the pixel before last in the bottom left, the timing can be 90 milliseconds (the start of the scan out of the last line) or more granular at 96 milliseconds.

In an example, the flow of FIG. 9 may include operation 908, where the controller determines whether the scan out associated with the location occurred before or after the update is received. If the scan out occurred during the frame before the update, operation 910 may follow operation 908. Otherwise, operation 920 may follow operation 908.

In an example, the flow of FIG. 9 may include operation 910, where the controller associates an already activated LUT with the update. That is because the scan out of the location occurs during the frame after the update data is determined. The controller can store update data corresponding to the update in a memory buffer (e.g., a working buffer) along with an association to the activated LUT.

In an example, the flow of FIG. 9 may include operation 920, where the controller associates the update with a to be activated LUT. That is because the scan out of the location occurred during the frame before the update data is determined. Whereas the update is received and determined at some point in time during the current frame, the to-be-activated LUT is activated at a subsequent point in time during the frame (e.g., near the end of the frame). Accordingly, the controller can store update data corresponding to the update in the memory buffer along with an indication that this data is to be used with the to-be-activated LUT.

Figure 10:
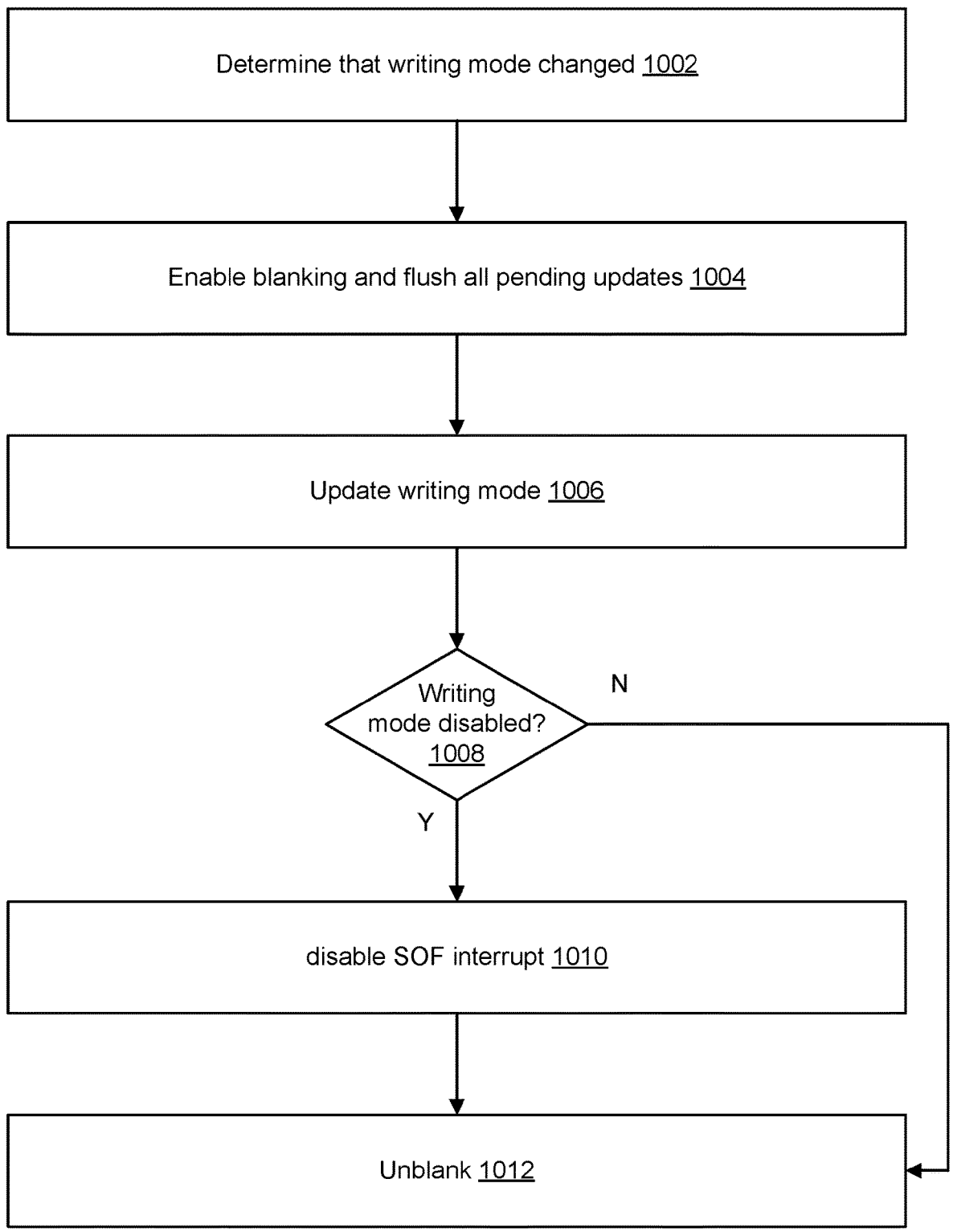
FIG. 10 illustrates an example of a flow for operating a computing device in a mode of a plurality of supported modes, according to embodiments of the present disclosure.

FIG. 10 illustrates an example of a flow for operating a computing device in a mode of a plurality of supported modes, according to embodiments of the present disclosure. The flow is described in connection with a writing mode. The writing mode is an example of a first mode that the computing device can be operated in or that can be enabled as part of operations of an application. In this mode, stylus input at the electrophoretic panel is used as handwriting input. A second mode (or more generally multiple other modes) can be supported. For instance, the second mode can be a normal mode in which the writing mode is disabled. In this case, stylus input at the electrophoretic panel is not used as handwriting input.

In an example, the flow of FIG. 10 may start at operation 1002, where the controller determines that the writing mode changed. For instance, the application sends data to the controller indicating a change to the writing mode. This data can indicate that the writing mode is enabled if currently disabled or, conversely, that the writing mode is disabled if currently enabled.

In an example, the flow of FIG. 10 may include operation 1004, where the controller enables blanking and flushes all pending updates. Enabling the blanking can represent stopping accepting new update requests until all pending updates are flushed. Flushing all pending updates can include complete processing of pending updates, where such updates can have corresponding data in an input queue.

In an example, the flow of FIG. 10 may include operation 1006, where the controller updates the writing mode. For instance, if currently disabled, the writing mode is updated to indicate that it is enabled. Conversely, if currently enabled, the writing mode is updated to indicate that it is disabled. The update can be stored as a mode state data (e.g., a flag set to true to indicate the enabling, and to false to indicate the disabling).

In an example, the flow of FIG. 10 may include operation 1008, where the controller determines whether the writing mode is disabled. For instance, the mode state data is retrieved to determine the current state of the writing mode. If disabled, operation 1010 may follow operation 1008. Otherwise, operation 1020 may follow operation 1008.

In an example, the flow of FIG. 10 may include operation 1010, where the controller disables SOF interrupt. For instance, the SOF interrupts are no longer generated.

In an example, the flow of FIG. 10 may include operation 1012, where the controller un-blanks. Un-blanking corresponds to accepting update requests and processing such requests.

Figure 11:
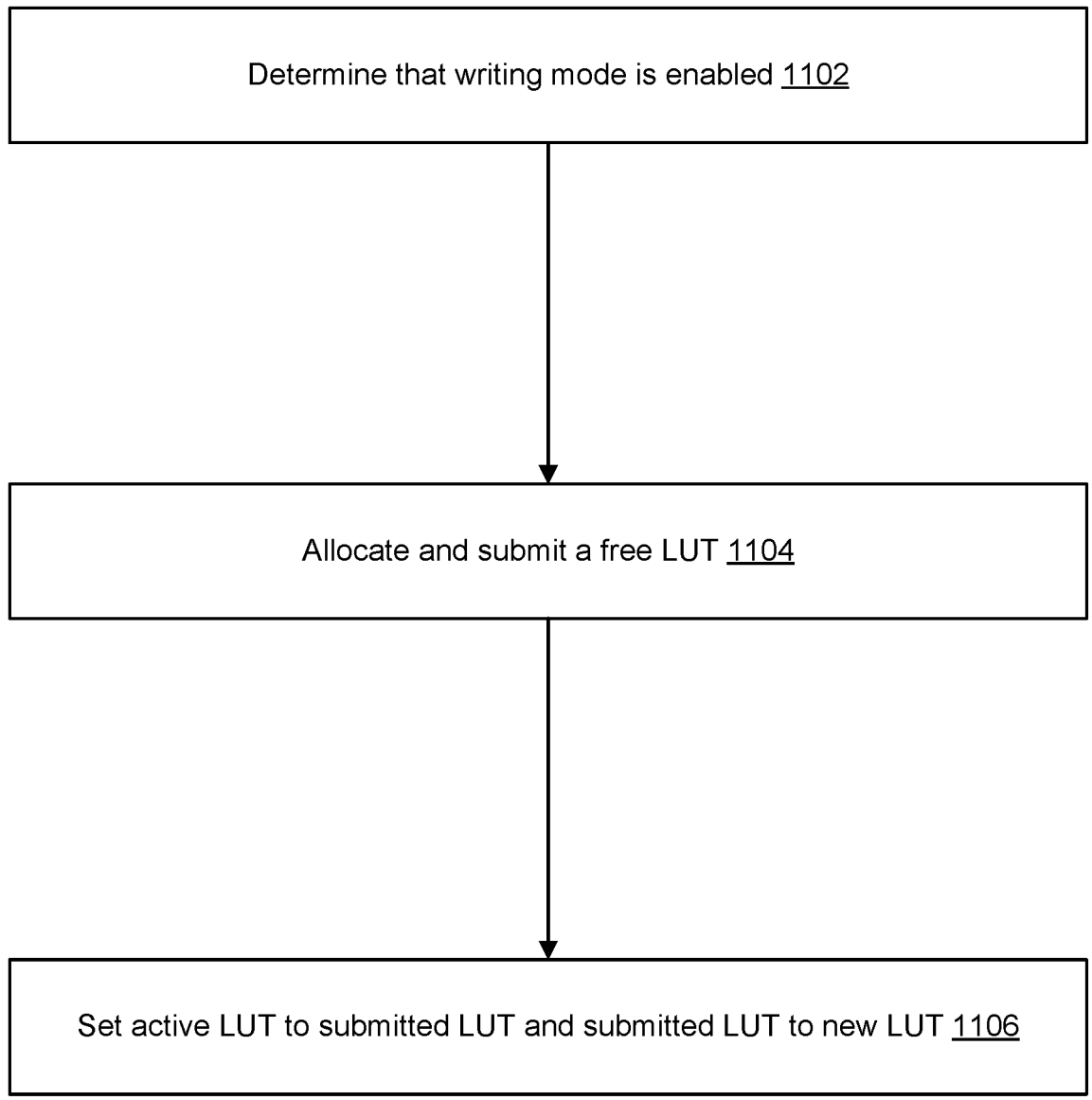
FIG. 11 illustrates an example of a flow for setting LUTs, according to embodiments of the present disclosure.

FIG. 11 illustrates an example of a flow for setting LUTs, according to embodiments of the present disclosure. This flow can be performed in an SOF interrupt service routine after the writing mode and SOF interrupt are enabled.

In an example, the flow of FIG. 11 may start at operation 1102, where the controller determines that the writing mode is enabled. For instance, the controller retrieves the mode state data and, accordingly, determines an enabled state.

In an example, the flow of FIG. 11 may include operation 1104, where the controller allocates and submits a free LUT. For instance, the controller checks different LUT tables (which may be implemented in hardware only or in software and hardware) and determines an LUT table that has not been activated yet. This LUT is selected in a frame for use in a next frame.

In an example, the flow of FIG. 11 may include operation 1106, where the controller sets the active LUT to the submitted LUT and the submitted LUT to a new LUT. For instance, this setting corresponds to activating the submitted LUT in the frame.

Figure 12:
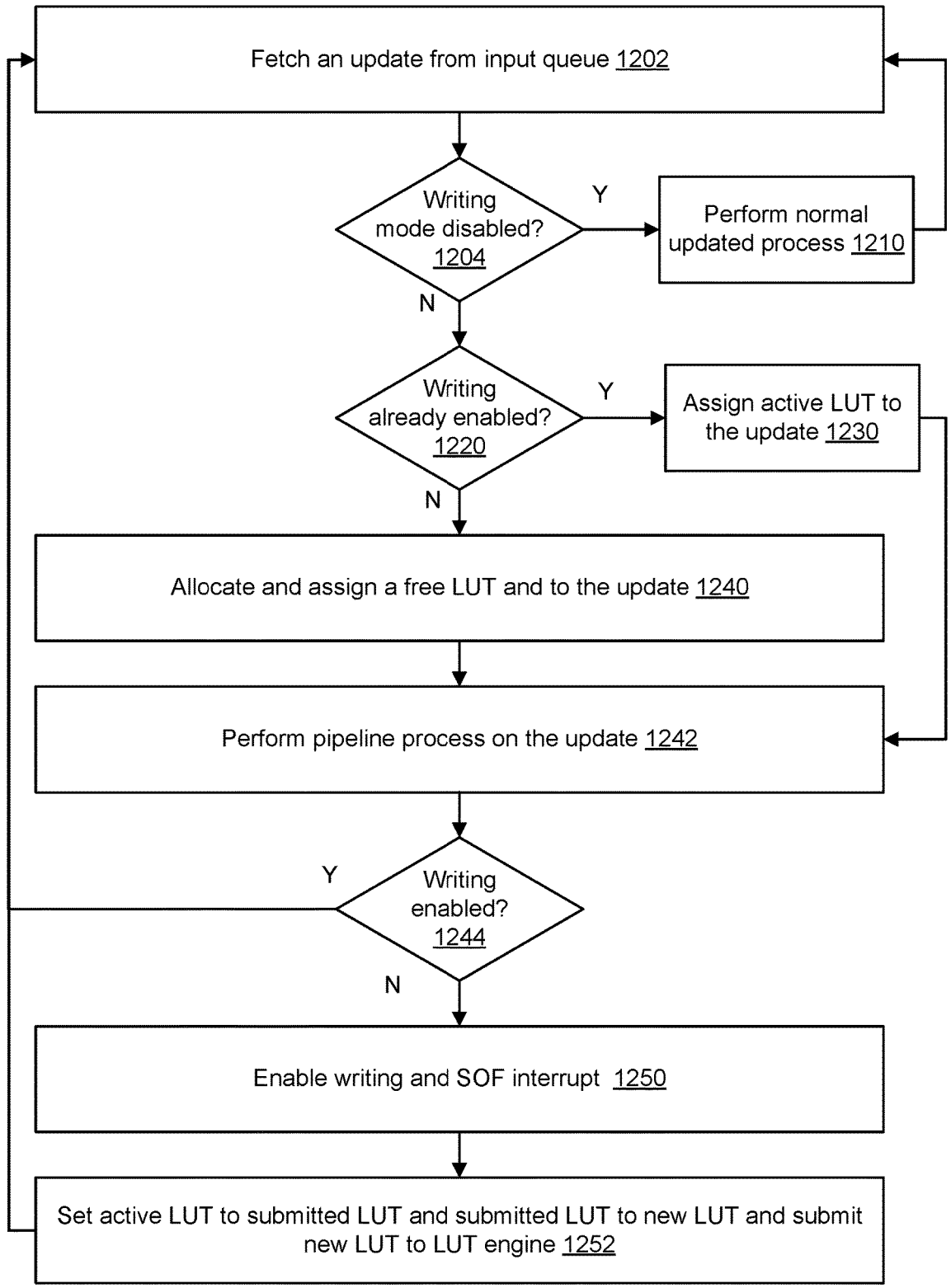
FIG. 12 illustrates an example of a flow for processing content updates, according to embodiments of the present disclosure.

FIG. 12 illustrates an example of a flow for processing content updates, according to embodiments of the present disclosure. In an example, the flow of FIG. 12 may start at operation 1202, where the controller fetches an update from an input queue. For instance, the application can store update data in the input queue, where this queue may be implemented as a content buffer.

In an example, the flow of FIG. 12 may include operation 1204, where the controller determines whether the writing mode is disabled or not. If the writing mode is disabled, operation 1210 may follow operation 1204. Otherwise, operation 1220 may follow operation 1204. For instance, this determination can be based on an output of an application requesting the writing mode to be enabled or disabled. If the request is to disable the writing mode, the controller can determine that the writing mode is currently enabled. In comparison, if the request is to enable the writing mode, the controller can determine that the writing mode is currently disabled.

In an example, the flow of FIG. 12 may include operation 1210, where the controller performs a normal update process. For instance, the normal update process corresponds to the non-continuous LUT activation technique described herein above. Accordingly, the normal update process involves activating a LUT in a frame "n" after an update is received in the frame "n," and using the activated LUT for presenting the update in a next frame "n+1." A loop back may occur to operation 1202 to process the next update.

In an example, the flow of FIG. 12 may include operation 1220, where the controller determines whether the writing is already enabled or not. If writing is already enabled, operation 1230 may follow operation 1220. Otherwise, operation 1240 may follow operation 1220, where the writing is then enabled by enabling the blanking, flushing pending updated, updating the state data, enable the SOF interrupt, and then disabling the blanking similar to the flow of FIG. 10. For example, the state mode indicates that the writing mode. Nonetheless, it may be possible that the writing itself has not been enabled yet. As such, this determination is performed based on data of the controller.

In an example, the flow of FIG. 12 may include operation 1230, where the controller assigns an active LUT to the update. Here, the continuous LUT activation technique is already in use and a LUT has already been activated during the previous frame "n−1." Accordingly, the controller assigns this already activated LUT "i−1" to the update received in the frame "n."

In an example, the flow of FIG. 12 may include operation 1240, where the controller allocates and assigns a free LUT to the update. Here, upon enabling the writing, the controller starts using the continuous LUT activation technique. Accordingly, the free LUT is the first LUT that is activated from the previous frame per this technique for use with the update received in the current frame.

In an example, the flow of FIG. 12 may include operation 1242, where the controller performs a pipeline process on the update. This pipeline process can be a pixel pipeline process, where each pixel of the update is written to a working buffer along with active or newly allocated LUT.

In an example, the flow of FIG. 12 may include operation 1244, where the controller determines after performing the pipeline process if the writing has already been enabled. If so, a loop back may occur to operation 1202 to process the next update. Otherwise, operation 1250 may follow operation 1244.

In an example, the flow of FIG. 12 may include operation 1250, where the controller enables the writing and the SOF interrupt. That may be the case because the writing mode has been disabled and needs to be re-enabled.

In an example, the flow of FIG. 12 may include operation 1252, where the controller sets the active LUT to a submitted LUT and the submitted LUT to a new LUT and submits a new LUT to a waveform LUT engine. A loop back may occur to operation 1202 to process the next update.

Figure 13:
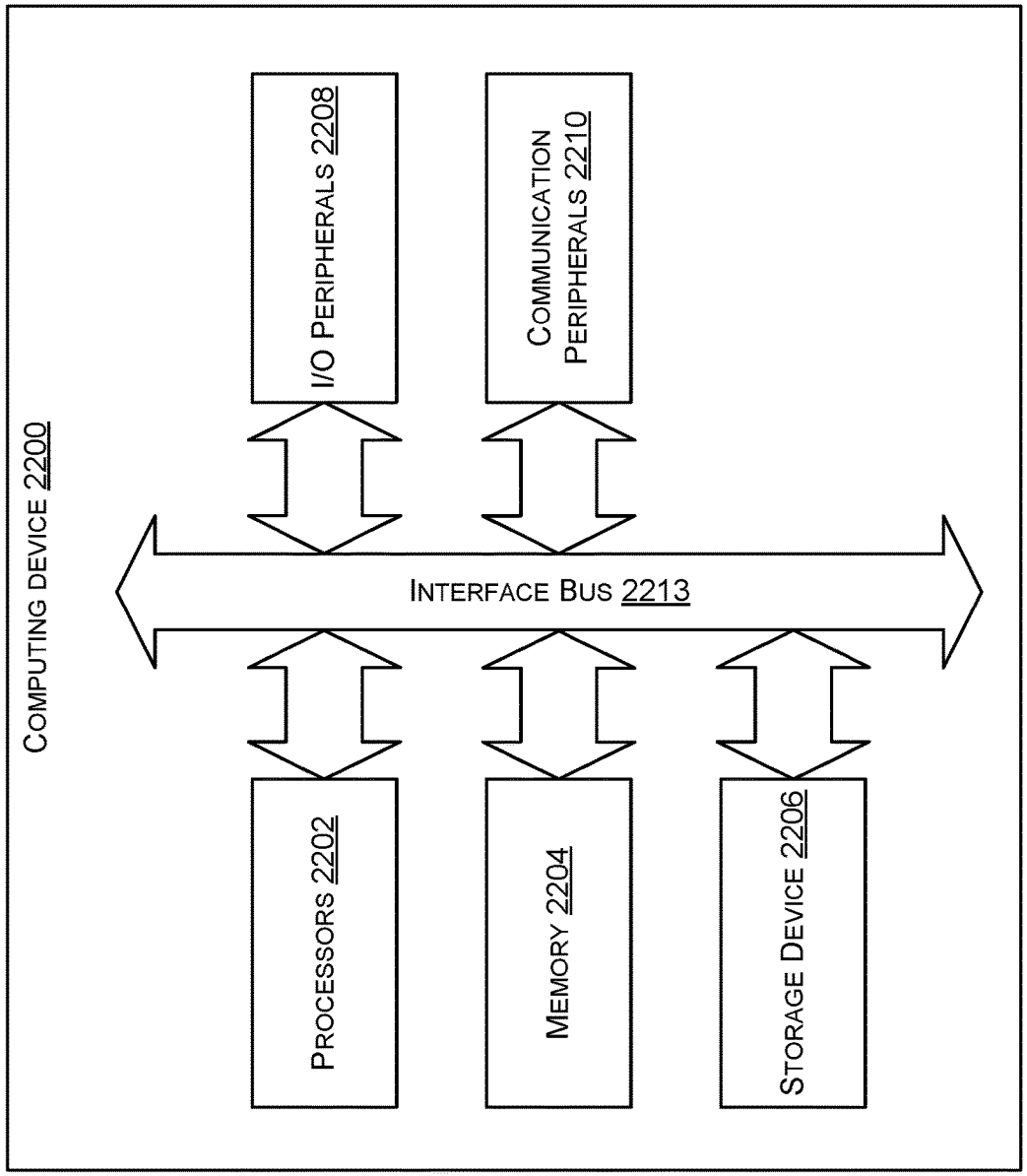
FIG. 13 illustrates an example of an architecture of a computing device, according to embodiments of the present disclosure.

FIG. 13 illustrates an example of an architecture of a computing device 1300, according to embodiments of the present disclosure. The computing device 1300 includes at least processors 1302, a memory 1304, a storage device 1306, input/output peripherals (I/O) 1308, communication peripherals 1310, and an interface bus 1312. The interface bus 1312 is configured to communicate, transmit, and transfer data, controls, and commands among the various components of the computing device 1300. The memory 1304 and the storage device 1306 include computer-readable storage media, such as RAM, ROM, electrically erasable programmable read-only memory (EEPROM), hard drives, CD-ROMs, optical storage devices, magnetic storage devices, electronic non-volatile computer storage, for example Flash® memory, and other tangible storage media. Any of such computer readable storage media can be configured to store instructions or program codes embodying aspects of the disclosure. The memory 1304 and the storage device 1306 also include computer readable signal media. A computer readable signal medium includes a propagated data signal with computer readable program code embodied therein. Such a propagated signal takes any of a variety of forms including, but not limited to, electromagnetic, optical, or any combination thereof. A computer readable signal medium includes any computer readable medium that is not a computer readable storage medium and that can communicate, propagate, or transport a program for use in connection with the computing device 1300.

Further, the memory 1304 includes an operating system, programs, and applications. The processors 1302 can include a controller, such as the controller 140 of FIG. 1 or the controller 210 of FIG. 2. At least one of the processors 1302 is configured to execute the stored instructions and includes, for example, a logical processing unit, a microprocessor, a digital signal processor, and other processors. The I/O peripherals 1308 include user interfaces, such as a keyboard, screen (e.g., an electrophoretic panel with a panel controller), microphone, speaker, other input/output devices, and computing components, such as graphical processing units, serial ports, parallel ports, universal serial buses, and other input/output peripherals. The I/O peripherals 1308 are connected to the processor 1302 through any of the ports coupled to the interface bus 1312. The communication peripherals 1310 are configured to facilitate communication between the computing device 1300 and other computing devices over a communication network and include, for example, a network interface controller, modem, wireless and wired interface cards, antenna, and other communication peripherals.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computing devices accessing stored software that programs or configures the portable device from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A system comprising:
an electrophoretic panel;
a stylus; and
a controller comprising a look-up table (LUT) hardware module and configured to:

cause, during a first time period, a first presentation of first content on the electrophoretic panel, a first pixel of the electrophoretic panel associated with a first color value in the first presentation, the first presentation being based at least in part on a first LUT that has been activated by being loaded in a memory of the LUT hardware module;

load, during the first time period and before receiving first update data indicating an update associated with the first pixel, a second LUT into the memory of the LUT hardware module such that the second LUT is activated during the first time period before the update is detected, wherein the second LUT is unassociated with any update data during the first time period;

receive, during a second time period, the first update data after the second LUT is activated, the first update data indicating a second color value of the first pixel and corresponding to a first contact between the stylus and the electrophoretic panel;

store, in a memory buffer, the first color value, the second color value, and an identifier of the second LUT;

determine, by at least using a look-up operation of the LUT hardware module, waveform data indicating a driving voltage that, upon application to the first pixel, causes a color change from the first color value to the second color value, the look-up operation using the first color value, the second color value, and the identifier in a look-up of the second LUT; and cause a second presentation of second content by at least changing a color of the first pixel according to the waveform data.

2. The system of claim 1, wherein the controller is further configured to:

receive, during a third time period, second update data associated with a second pixel and corresponding to a second contact between the stylus and the electrophoretic panel;

determine that a scan out of the second pixel has occurred during prior to receiving the second update data;

loading, after the second update data is received, a third LUT into the memory; and store an association between the second update data with the third LUT, wherein a next scan out of the second pixel uses the third LUT based on the association.

3. The system of claim 1, wherein the controller is further configured to:

determine that the first update data is received prior to a scan out of the first pixel during the second time period; and store an association between the second LUT and the first update data, wherein the scan out of the first pixel uses the second LUT based on the association.

4. A device comprising:

an electrophoretic panel; and a controller comprising a look-up table (LUT) hardware module and configured to:

cause, during a first time period, a first output on the electrophoretic panel based at least in part on a first LUT loaded into a memory accessible to the LUT hardware module;

load, during the first time period and before receiving update data indicating an update associated with a pixel of the electrophoretic panel, a second LUT into the memory accessible to the LUT hardware module, wherein the second LUT is unassociated with any update data during the first time period;

receive, during a second time period after the second LUT is loaded into the memory, the update data indicating a color change to the pixel;

associate the update data with the second LUT;

determine, based at least in part on the update data and the second LUT, waveform data corresponding to the color change; and cause, during the second time period, a second output indicating the update on the electrophoretic panel based at least in part on the waveform data.

5. The device of claim 4, wherein the controller is further configured to:

receive an update request of an application executing on the device, the update request indicating the pixel and a next color value of the pixel; and store, in a memory buffer based at least in part on the second LUT being already loaded in the memory when the update data is received, the next color value, a current color value of the pixel, and an identifier of the second LUT.

6. The device of claim 4, wherein the controller is further configured to:

determine a location of the pixel on the electrophoretic panel; and determine that the second LUT and the update data are to be associated together based at least in part on the location.

7. The device of claim 6, wherein the update data and the pixel are first update data and a first pixel, respectively, and wherein the controller is further configured to:

determine second update data associated with a second pixel of the electrophoretic panel;

determine a location of the second pixel on the electrophoretic panel;

determine, based at least in part on the location of the second pixel, that the second update data is to be associated with a third LUT;

loading, after the second update data is received, the third LUT into the memory; and associating the second update data with the third LUT after the third LUT is loaded.

8. The device of claim 4, wherein the controller is further configured to:

determine a location of the pixel on the electrophoretic panel; and determine that a timing of a scan out of the location occurs during the second time period after the update data is received, wherein the update data is associated with the second LUT based at least in part on the timing.

9. The device of claim 8, wherein the update data, the pixel, and the second time period are first update data, a first pixel, and a frame, respectively, and wherein the controller is further configured to:

receive, during the frame, second update data associated with a second pixel;

determine a second location of the second pixel on the electrophoretic panel;

determine that a scan out of the second location has occurred during the frame prior to receiving the second update data;

load, during the frame after the second update data is received, a third LUT into the memory; and associate the second update data with the third LUT.

10. The device of claim 4, wherein the update data is first update data received while the device is operated in a first mode that allows LUT activation prior to update data reception, wherein the pixel is a first pixel, and wherein the controller is further configured to:
  receive, while the device is operated in a second mode that necessitates the LUT activation after the update data reception, second update data associated with a second pixel;
  load, after the second update data is received, a third LUT in the memory; and
  associate the third LUT with the second update data.

11. The device of claim 10, wherein the controller is further configured to:
  receive, from an application executing on the device, a first request associated with enabling the first mode;
  enable the first mode based at least in part on the first request;
  receive, from the application while the first mode is enabled, the first update data;
  receive, from the application, a second request associated with enabling the second mode;
  enable the second mode based at least in part on the second request; and
  receive, from the application while the second mode is enabled, the second update data.

12. A method implemented by a device, the method comprising:
  causing, during a first time period, a first output on an electrophoretic panel based at least in part on a first LUT loaded into a memory accessible to a LUT hardware module;
  loading, during the first time period and before receiving update data indicating an update associated with a pixel of the electrophoretic panel, a second LUT into the memory accessible to the LUT hardware module, wherein the second LUT is unassociated with any update data during the first time period;
  receiving, during a second time period after the second LUT is loaded into the memory, the update data indicating a color change to the pixel;
  associating the update data with the second LUT;
  determining, based at least in part on the update data and the second LUT, waveform data corresponding to the color change; and
  causing, during the second time period, a second output indicating the update on the electrophoretic panel based at least in part on the waveform data.

13. The method of claim 12, further comprising:
  causing, during the first time period, a presentation of content on the electrophoretic panel based at least in part on an execution of an application on a device;
  receiving a first request of the application for a mode that allows LUT activation prior to update data reception; and
  receiving, while the device is operating in the mode and based at least in part on a contact between a stylus of the device and the electrophoretic panel, a second request indicating the update data, the contact associated with the pixel.

14. The method of claim 13 wherein the second LUT is associated with a waveform type and is loaded while the device is operating in the mode, and wherein the second request indicates the waveform type.

15. The method of claim 12, wherein the first time period is a first frame, wherein the second time period is a second frame, wherein the waveform data is determined during the second frame, and wherein the method further comprises:
  causing a presentation of the color change of the pixel during the second frame.

16. The method of claim 12, further comprising:
  causing, during the first time period, a presentation of content based at least in part on an execution of an application on the device, wherein the second LUT is associated with a waveform type; and
  determining that the application is associated with the waveform type, wherein the update data is associated with the second LUT based at least in part on the waveform type.

17. The method of claim 12, further comprising:
  receiving a request of an application executing on the device and indicating the update data; and
  determining that a first mode is enabled and indicates that the second LUT is to be loaded prior to receiving the update data.

18. The method of claim 17, further comprising:
  receiving, during a first frame, second update data from the application;
  determining that the first mode is disabled during the first frame;
  loading, after the second update data is received, a third LUT into the memory; and
  causing, during a second frame after the first frame, a second output on the electrophoretic panel based at least in part on the third LUT and the second update data.

19. The method of claim 12, further comprising:
  determining a location of the pixel on the electrophoretic panel; and
  determining that the second LUT and the update data are to be associated together based at least in part on the location.

20. The method of claim 19, further comprising:
  determining that a scan out of the location occurs after the update data is received, wherein the second LUT and the update data are associated together based on a timing of the scan out.

* * * * *